(12) United States Patent  
Sakaguchi et al.

(10) Patent No.: US 11,964,495 B2  
(45) Date of Patent: Apr. 23, 2024

(54) INK SET, PRINTER, AND PRINTING METHOD

(71) Applicant: RICOH COMPANY, LTD., Tokyo (JP)

(72) Inventors: Hiromi Sakaguchi, Kanagawa (JP); Itsuro Sasaki, Kanagawa (JP); Ayaka Tanaka, Kanagawa (JP); Naoto Shimura, Tokyo (JP); Shunsuke Horie, Kanagawa (JP); Hiroshi Gotou, Kanagawa (JP); Yuta Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 233 days.

(21) Appl. No.: 17/422,516

(22) PCT Filed: Jan. 21, 2020

(86) PCT No.: PCT/JP2020/001959  
§ 371 (c)(1),  
(2) Date: Jul. 13, 2021

(87) PCT Pub. No.: WO2020/158514  
PCT Pub. Date: Aug. 6, 2020

(65) Prior Publication Data  
US 2022/0024217 A1    Jan. 27, 2022

(30) Foreign Application Priority Data

Jan. 31, 2019 (JP) .................................. 2019-015780  
Nov. 6, 2019 (JP) .................................. 2019-201182

(51) Int. Cl.  
*B41J 2/01* (2006.01)  
*B41J 2/045* (2006.01)  
(Continued)

(52) U.S. Cl.  
CPC ........... *B41J 2/211* (2013.01); *B41J 2/04541* (2013.01); *B41J 2/2117* (2013.01); *C09D 11/40* (2013.01)

(58) Field of Classification Search  
CPC .... C09D 11/033; C09D 11/40; B41J 11/0015; B41J 2/01  
See application file for complete search history.

(56) References Cited

U.S. PATENT DOCUMENTS

2003/0008938 A1    1/2003  Sano et al.  
2003/0071883 A1    4/2003  Suzuki et al.  
(Continued)

FOREIGN PATENT DOCUMENTS

EP    1 164 173 A1    12/2001  
EP    1 285 950 A1    2/2003  
(Continued)

OTHER PUBLICATIONS

International Search Report dated Apr. 17, 2020 in PCT/JP2020/001959 filed Jan. 21, 2020.  
(Continued)

*Primary Examiner* — Lam S Nguyen  
(74) *Attorney, Agent, or Firm* — Grüneberg and Myers PLLC

(57) ABSTRACT

Provided is an ink set including: an ink containing a cyan pigment; an ink containing a magenta pigment; and an ink containing a yellow pigment, wherein the proportion of the cyan pigment is 0.70% by mass or greater but 1.40% by mass or less, and wherein the proportion of the magenta pigment and the proportion of the yellow pigment are both higher than the proportion of the cyan pigment.

23 Claims, 5 Drawing Sheets

(51) Int. Cl.
  *B41J 2/21* (2006.01)
  *C09D 11/40* (2014.01)

(56) References Cited

U.S. PATENT DOCUMENTS

| | | |
|---|---|---|
| 2003/0226473 A1 | 12/2003 | Ishimoto |
| 2008/0047463 A1 | 2/2008 | Tanque et al. |
| 2008/0182085 A1 | 7/2008 | Oyanagi et al. |
| 2011/0036266 A1 | 2/2011 | Oyanagi et al. |
| 2012/0006224 A1 | 1/2012 | Oyanagi et al. |
| 2012/0274715 A1 | 11/2012 | Oyanagi et al. |
| 2013/0222480 A1* | 8/2013 | Aoki .................. B41J 11/0015 347/102 |
| 2013/0286081 A1 | 10/2013 | Sarkisian et al. |
| 2016/0376455 A1* | 12/2016 | Katoh ...................... B41J 2/01 428/195.1 |
| 2018/0030292 A1* | 2/2018 | Gotou .................. C09D 11/033 |
| 2019/0092956 A1 | 3/2019 | Imanaga et al. |
| 2019/0211223 A1 | 7/2019 | Doumaux et al. |
| 2019/0270900 A1 | 9/2019 | Nakamura et al. |
| 2019/0283406 A1 | 9/2019 | Fujita et al. |
| 2020/0023648 A1 | 1/2020 | Gotou et al. |
| 2020/0102467 A1 | 4/2020 | Nakamura et al. |
| 2020/0207096 A1 | 7/2020 | Horie et al. |

FOREIGN PATENT DOCUMENTS

| | | |
|---|---|---|
| EP | 1 422 072 A1 | 5/2004 |
| EP | 1 746 138 A1 | 1/2007 |
| EP | 1 950 260 A1 | 7/2008 |
| JP | 2004-314352 A | 11/2004 |
| JP | 2010-159412 | 7/2010 |
| JP | 2010-173215 | 8/2010 |
| JP | 2011-506672 | 3/2011 |
| JP | 2014-205767 A | 10/2014 |
| JP | 2015-183160 | 10/2015 |
| JP | 2017-105193 A | 6/2017 |
| JP | 2017-105194 | 6/2017 |
| JP | 2017-226743 A | 12/2017 |
| JP | 2018-30957 A | 3/2018 |
| WO | WO 2009/134247 A1 | 11/2009 |
| WO | 2017/126345 | 7/2017 |
| WO | WO 2018/143961 A1 | 8/2018 |
| WO | 2018/221370 | 12/2018 |

OTHER PUBLICATIONS

Written Opinion dated Apr. 17, 2020 in PCT/JP2020/001959 filed Jan. 21, 2020.

Japanese Office Action dated Oct. 24, 2023, in Japanese Patent Application No. 2019-201182, 3 pages.

Japanese Office Action dated Feb. 20, 2024, in Japanese Application No. 2019-201182, 3 pages.

* cited by examiner

[Fig. 1]
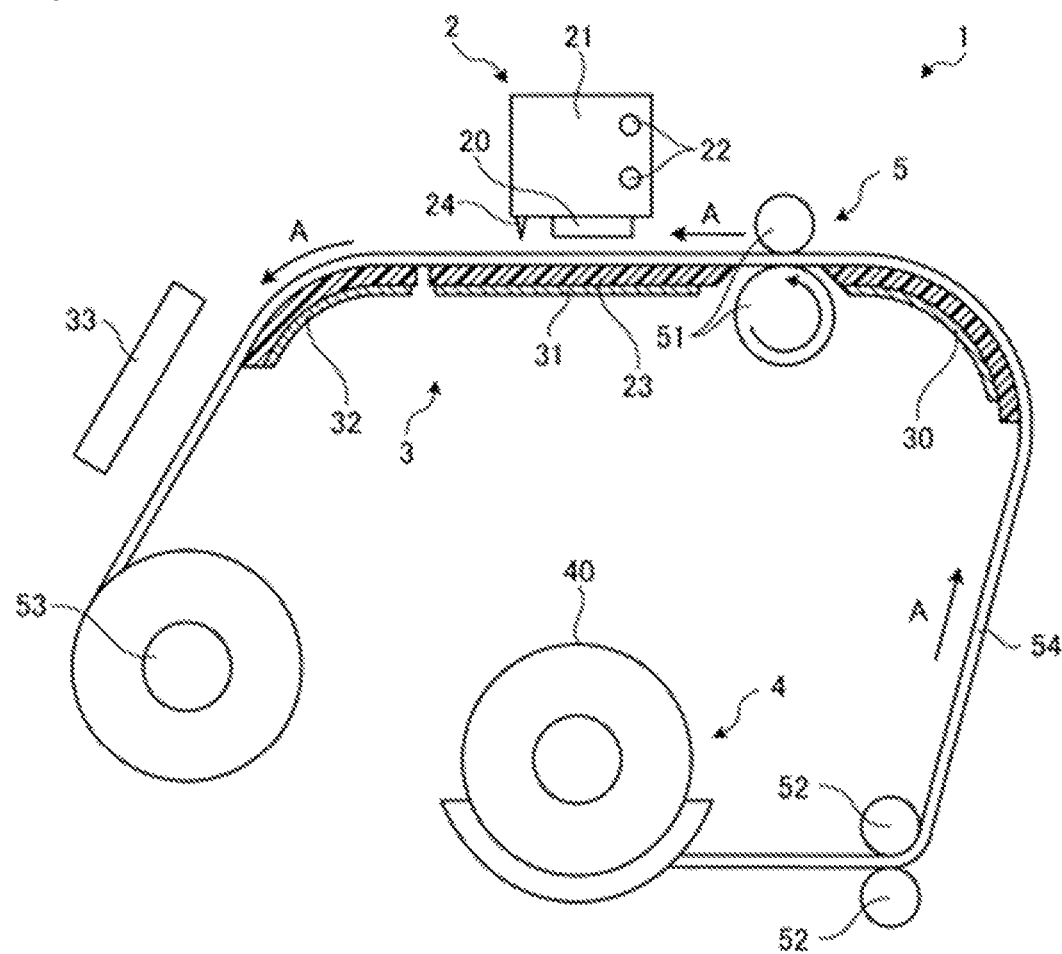

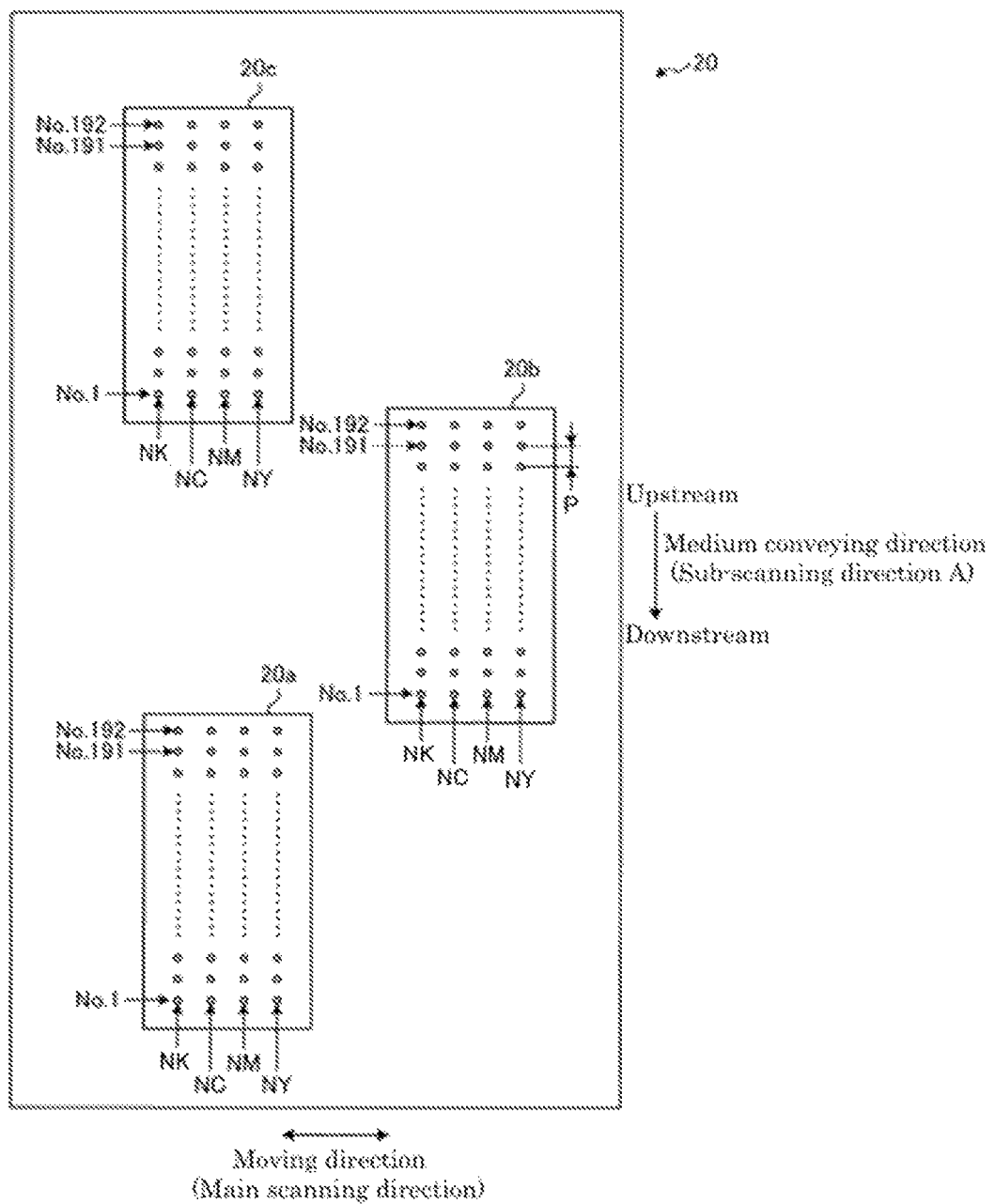
[Fig. 2]

[FIG. 3]
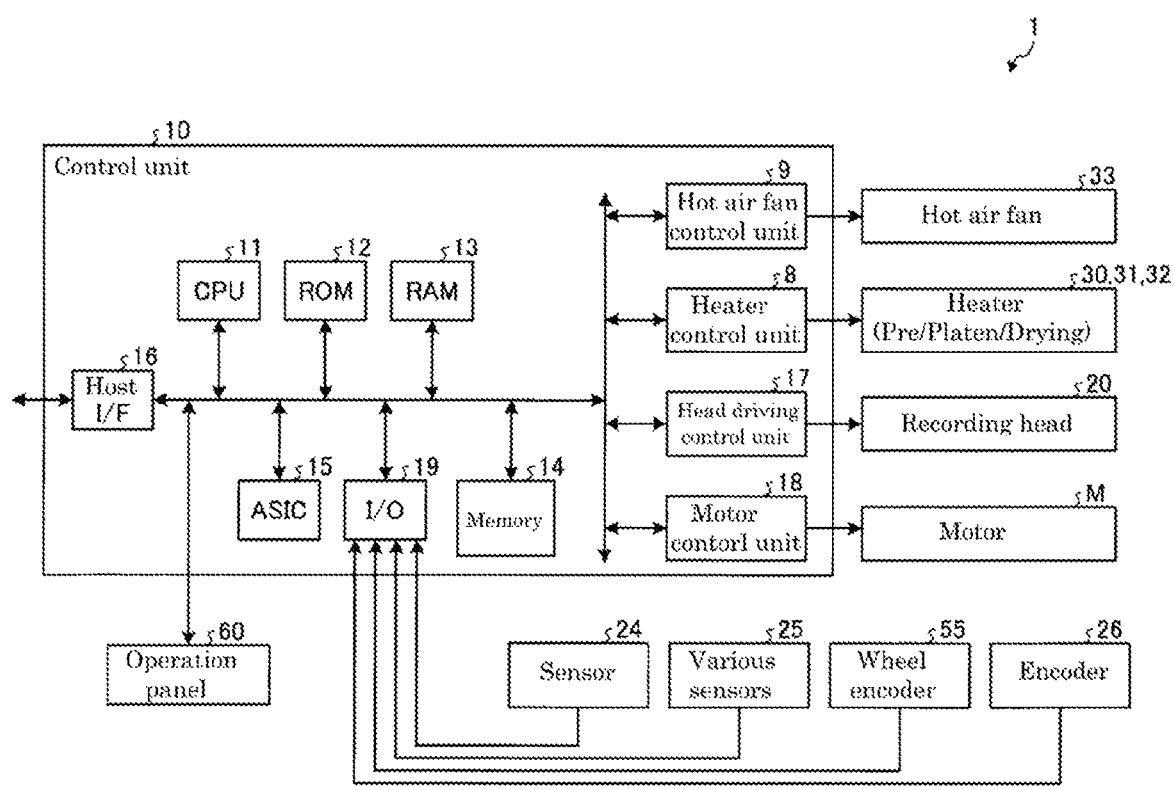

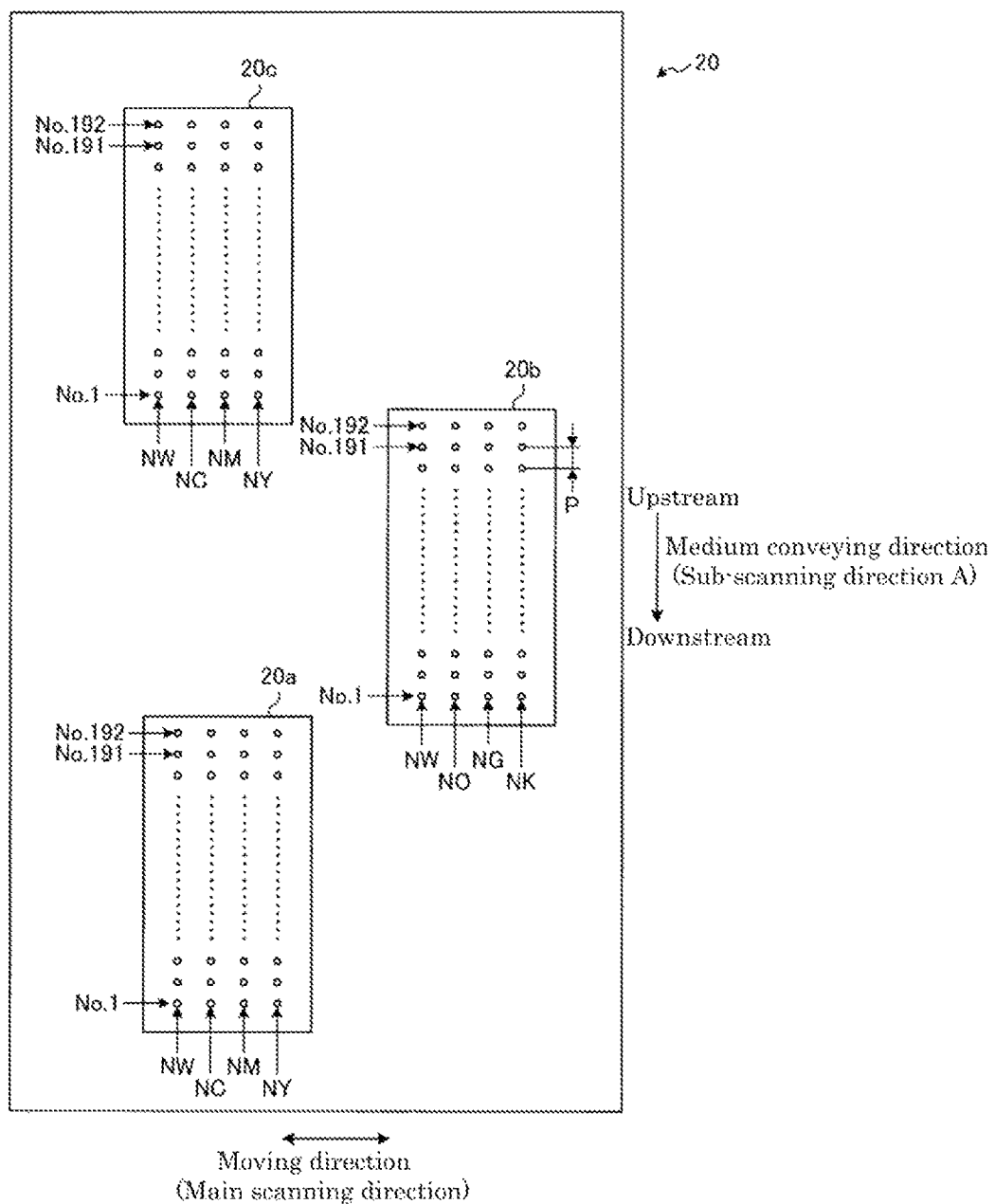

[Fig. 5]
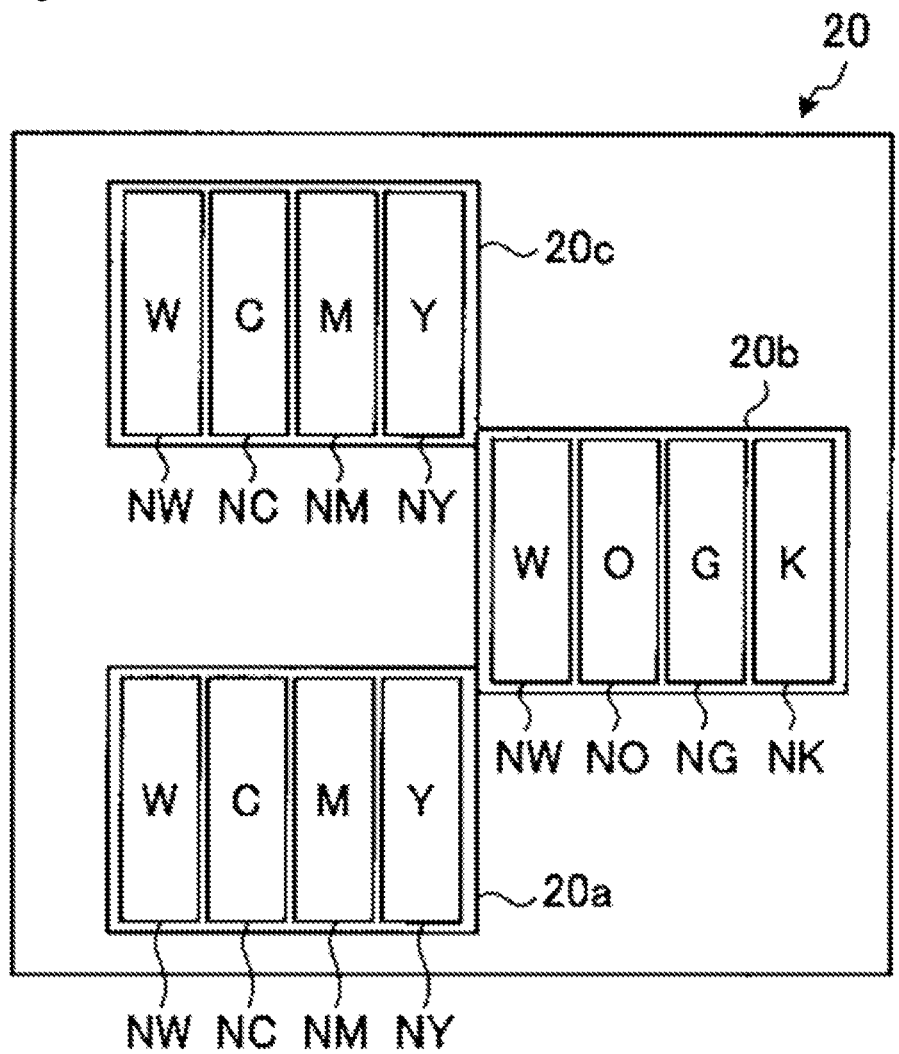

INK SET, PRINTER, AND PRINTING METHOD

TECHNICAL FIELD

The present disclosure relates to an ink set, a printer, and a printing method.

BACKGROUND ART

Compared with other printing methods, inkjet printing methods have simple processes, can be easily adapted to full-color operations, and can provide high-resolution images even when used on apparatuses having simple configurations. These advantages have spread the inkjet printing methods to personal and office use and industrial printing fields.

In industrial printing fields, a high productivity is needed. In sign graphics fields such as signages presented indoors and outdoors, wide inkjet printers have been launched. Improvement of productivity of wide inkjet printers has been highly demanded. Common wide inkjet printers employ a multipath system of scanning a head in the medium width direction (main scanning direction), and conveying the medium perpendicularly (sub-scanning direction) to the head scanning direction. In order to improve productivity of such a multipath system, there is a need for increasing a print area per pass. To this end, it is effective to use a head provided with a plurality of nozzle lines, which are arrangements, in the sub-scanning direction perpendicular to the main scanning direction, of a plurality of nozzle holes through which inks are discharged. However, such a head has a side effect of making ink droplets more likely to land on wrong positions. Hence, what remains to be solved is to satisfy both of productivity and image quality at the same time.

Here, what needs to be done is, for example, to prevent occurrence of gloss variation due to ink droplet landing failure during reciprocating movement of the head, using an ink set including a yellow ink, a magenta ink, and a cyan ink. To this end, adjusting the kinds of the inks to be discharged through the nozzle holes included in the nozzle lines of the head has been proposed (for example, see PTL 1).

Moreover, an ink set of aqueous inkjet inks has been proposed, wherein the proportions of pigments in a cyan ink, a magenta ink, and a yellow ink are from 1.5% by weight through 6% by weight respectively, and the pigment proportion ratio (cyan:magenta:yellow) is 1:from 1 through 2:from 1 through 3 (for example, see PTL 2).

CITATION LIST

Patent Literature

PTL 1: Japanese Unexamined Patent Application Publication No. 2004-314352
PTL 2: Japanese Unexamined Patent Application Publication No. 2014-205767

SUMMARY OF INVENTION

Technical Problem

The present disclosure has an object to provide an ink set capable of suppressing occurrence of color variation.

Solution to Problem

According to one aspect of the present disclosure, an ink set includes an ink containing a cyan pigment, an ink containing a magenta pigment, and an ink containing a yellow pigment. The proportion of the cyan pigment is 0.70% by mass or greater but 1.40% by mass or less. The proportion of the magenta pigment and the proportion of the yellow pigment are both higher than the proportion of the cyan pigment.

Advantageous Effects of Invention

The present disclosure can provide an ink set capable of suppressing occurrence of color variation.

BRIEF DESCRIPTION OF DRAWINGS

FIG. 1 is a schematic view illustrating an example configuration of a recording apparatus.
FIG. 2 is a plan view illustrating an example nozzle configuration of a recording head.
FIG. 3 is a block diagram illustrating an example configuration of a control system of an inkjet recording device.
FIG. 4 is a plan view illustrating another example nozzle configuration of a recording head.
FIG. 5 is a schematic view illustrating an example color combination of each nozzle line in a simplified manner.

DESCRIPTION OF EMBODIMENTS (Ink Set)

An ink set of the present disclosure includes an ink containing a cyan pigment, an ink containing a magenta pigment, and an ink containing a yellow pigment. The proportion of the cyan pigment is 0.70% by mass or greater but 1.40% by mass or less. The proportion of the magenta pigment and the proportion of the yellow pigment are both higher than the proportion of the cyan pigment. The inks further contain other components as needed.

The problem of the existing technique described in Japanese Unexamined Patent Application Publication No. 2004-314352 is that the technique cannot prevent occurrence of ink droplet landing failure when a wide printer having a head including a plurality of nozzle lines is used.

The existing technique described in Japanese Unexamined Patent Application Publication No. 2014-205767 has an excellent printablity over common base materials, particularly base materials having a low water absorbency such as coat paper, art paper, and vinyl chloride sheets, aims for providing printed matters having a high weatherability and a high color gumut, and does not aim for being able to suppress occurrence of color variation. Moreover, Japanese Unexamined Patent Application Publication No. 2014-205767 wherein the cyan pigment is contained in a high proportion of 1.5% by mass or greater in the cyan ink included in the ink set has a problem of being unable to suppress occurrence of color variation over impermeable print media.

The ink set of the present disclosure including an ink containing a cyan pigment, an ink containing a magenta ink, and an ink containing a yellow ink, wherein the proportion of the cyan pigment is 0.70% by mass or greater but 1.40% by mass or less, and wherein the proportion of the magenta pigment and the proportion of the yellow pigment are both higher than the proportion of the cyan pigment has been found possible to provide an ink set capable of suppressing occurrence of color variation while also realizing a high productivity when used in a printer including a discharging unit provided with three or more nozzle lines, which are arrangements, in the sub-scanning direction perpendicular to the main scanning direction, of a plurality of nozzle holes through which inks are discharged.

Color variation is easily recognizable particularly with the cyan color. Therefore, setting the proportion of the cyan pigment to 0.70% by mass or greater but 1.40% by mass or less enables reducing the density per dot of the ink containing the cyan pigment, providing a greater effect of suppressing color variation. It is preferable that the proportion of the magenta pigment and the proportion of the yellow pigment both be 1.4 times or greater but 4.5 times or less higher than the proportion of the cyan pigment. This provides a good image quality without color variation.

In order to make the effect described above more certain, it is preferable that the proportion of the cyan pigment be 1.0% by mass or greater but 1.2% by mass or less and that the proportion of the magenta pigment and the proportion of the yellow pigment be both 2 times or greater but 3 times or less higher than the proportion of the cyan pigment.

The proportion of the cyan pigment of 0.70% by mass or greater but 1.40% by mass or less enables suitable use over impermeable or lowly-permeable print media. A cyan pigment contained in a low proportion stays within a superficial level of print media and expresses a good color developability when the print media are impermeable print media such as polyvinyl chloride (PVC) and polyethylene terephthalate (PET), while expressing a poor color developability over permeable print media such as cloth and paper because these print media are easily permeable by the pigment.

The ink set of the present disclosure is suitably used with a printer including a discharging unit provided with three or more nozzle lines, which are arrangements, in the sub-scanning direction perpendicular to the main scanning direction, of a plurality of nozzle holes through which inks are discharged. It is more preferable to use the ink set with a wide printer including a discharging unit provided with six or more nozzle lines. This enables high-speed printing and greatly improves productivity.

In order to analyze each ink in the ink set and measure the proportion of the pigment contained in each ink, a method of separating the ink into a supernatant and a sediment by a centrifugation method, collecting the precipitate, repeating washing the precipitate with an organic solvent and filtrating the precipitate to pick up the pigment, and weighing the picked-up pigment may be used. The structure of the pigment can be confirmed by analyzing the pigment by a GC-MS analysis and a data analysis.

<Centrifugation>
Device: HIMAC CS150GX available from Hitachi Koki Co., Ltd
Rotation speed: 150,000 rpm
Rotation time: 1 hour
<GC-MS>
Device: QP5000 available from Shimadzu Corporation
Column: ULTRA ALLOY-5 L=30 m, ID=0.25 mm, Film=0.25 micrometers
Column temperature elevation: from 50 degrees C. through 330 degrees C.
Column flow rate: 1.0 mL/min
Split: 1:100
Ionization method: EI method (70 eV)
Mass range to be measured: m/z 33 through 600
Analyzing software for data analysis: GCMS SOLUTION available from Shimadzu Corporation According to an aspect of the present disclosure, the ink set further includes an ink containing a black pigment, satisfies the formulae (1) and (2) below, and preferably satisfy the following formula: proportion of black pigment=proportion of magenta pigment. This makes it possible to provide an ink set capable of realizing a high productivity and also suppressing occurrence of color variation, when used with a printer including a discharging unit provided with four or more nozzle lines, which are arrangements, in the sub-scanning direction perpendicular to the main scanning direction, of a plurality of nozzle holes through which inks are discharged.

$$\text{Proportion of black pigment} > \text{proportion of yellow pigment} > \text{proportion of cyan pigment} \quad \text{formula (1)}$$

$$\text{Proportion of magenta pigment} > \text{proportion of yellow pigment} > \text{proportion of cyan pigment} \quad \text{formula (2)}$$

According to an aspect of the present disclosure, the ink set further includes an ink containing a white pigment. This makes it possible to form an image with a white background over a transparent base material.

According to an aspect of the present disclosure, a ratio (P/R) of the proportion P of the cyan pigment to the proportion R of the resin in each of the inks of the ink set is 0.08 or greater but 0.20 or less. This makes it possible to suppress occurrence of color variation.

The ink containing a cyan pigment, the ink containing a magenta pigment, the ink containing a yellow pigment, the ink containing a black pigment, and the ink containing a white pigment constituting the ink set of the present disclosure will be described below. These inks may be collectively referred to simply as "inks" hereinafter.

For example, the ink containing a cyan pigment encompasses a cyan ink and a light cyan ink. The ink containing a cyan pigment encompasses inks varied in the cyan pigment concentration.

<Inks>
The organic solvent, water, coloring material, resin and additives for use in the inks are described next.

<Organic Solvent>
There is no specific limitation on the type of the organic solvent used in the present disclosure. For example, water-soluble organic solvents are suitable. Specific examples thereof include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate. One of these water-soluble organic solvents may be used alone or two or more of these water-soluble organic solvents may be used in combination.

Since the water-soluble organic solvent serves as a humectant and also imparts a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethylene glycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

Inks encompass water-based inks containing water and an organic solvent as liquid components and solvent inks mainly containing an organic solvent as a liquid component.

In order to achieve the effect of the present disclosure, it is preferable that the inks be water-based inks containing water, and that the proportion of an organic solvent having a solubility parameter (SP value) of 10 or less be 20% by mass or less. A water-based ink in which the proportion of an organic solvent having a SP value of 10 or less is 20% by mass or less has a controlled permeability to make the pigment stay within the superficial level of print media, and can realize a high productivity while also suppressing occurrence of color variation. An organic solvent having a SP value of 10 or less and contained in a proportion greater than 20% by mass increases permeability to print media, and makes it harder for a pigment to develop a color by allowing the pigment to permeate print media particularly when the print media are permeable, leading to a risk of occurrence of color variation.

Solubility parameter (SP value) is a value defined according to the regular solution theory introduced by Hildebrand, and serves as an index of the solubility of a binary solution.

In the present disclosure, a SP value is a value calculated by a Fedors method. A SP value is expressed by a square root of cohesive energy density according to the regular solution theory, and the unit of a SP value is $(cal/cm^3)^{0.5}$. Generally, a SP value can be calculated with widely used simple software.

Examples of the organic solvent having a SP value of 10 or less include 3-methoxy-N,N-dimethyl propionamide (with a SP value of 9.2), isopropylidene glycerol (with a SP value of 9.8), 3-methoxy-1-butanol (with a SP value of 10.0), dipropylene glycol monopropyl ether (with a SP value of 9.5), tripropylene glycol monomethyl ether (with a SP value of 9.4), diethylene glycol diethyl ether (with a SP value of 8.2), and triethylene glycol butyl methyl ether (with a SP value of 8.4). One of these organic solvents may be used alone or two or more of these organic solvents may be used in combination.

<Water>

The proportion of water in the ink has no particular limit and can be suitably selected to suit to a particular application. In terms of the drying property and discharging reliability of the ink, the proportion is preferably from 10 through 90 percent by mass and more preferably from 20 through 60 percent by mass.

<Pigment>

The pigment includes inorganic pigments and organic pigments. These pigments can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4 (Phthalocyanine Blue), 16, 17:1, 56, 60, and 63; and C.I. Pigment Green 1, 4, 7, 8, 10, 17, 18, and 36. One of these pigments may be used alone or two or more of these pigments may be used in combination.

To obtain the ink, the pigment is dispersed by, for example, preparing a self-dispersible pigment by introducing a hydrophilic functional group into the pigment, coating the surface of the pigment with resin, or using a dispersant.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by microcapsules to make the pigment dispersible in water. This can be referred to as a resin-coated pigment. In this case, the pigment to be added to ink is not necessarily wholly coated with resin. Pigments partially or wholly uncovered with resin may be dispersed in the ink unless the pigments have an adverse impact.

To use a dispersant, for example, a known dispersant of a small molecular weight type or a high molecular weight type represented by a surfactant is used to disperse the pigments in ink.

As the dispersant, it is possible to use, for example, anionic surfactants, cationic surfactants, nonionic surfactants, amphoteric surfactants, etc. depending on the pigments.

Also, a nonionic surfactant (RT-100, manufactured by TAKEMOTO OIL & FAT CO., LTD.) and a formalin condensate of naphthalene sodium sulfonate are suitable as dispersants.

These dispersants can be used alone or in combination.

<Pigment Dispersion>

The ink can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, pigment, pigment dispersant, and other optional components and adjusting the particle diameter. It is good to use a dispersing device for dispersion.

The particle diameter of the pigment in the pigment dispersion has no particular limit. For example, the maximum frequency in the maximum number conversion is preferably from 20 through 500 nm and more preferably from 20 through 150 nm to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 through 50 percent by mass and more preferably from 0.1 through 30 percent by mass.

During the production, coarse particles are optionally filtered off from the pigment dispersion with a filter, a centrifuge, etc. preferably followed by degassing.

<Resin>

The type of the resin contained in the ink has no particular limit and can be suitably selected to suit to a particular application. Specific examples thereof include, but are not limited to, urethane resins, polyester resins, acrylic-based resins, vinyl acetate-based resins, styrene-based resins, butadiene-based resins, styrene-butadiene-based resins, vinyl-chloride-based resins, acrylic styrene-based resins, and acrylic silicone-based resins.

Particles of such resins may be also used. It is possible to mix a resin emulsion in which the resin particles are dispersed in water serving as a dispersion medium with materials such as a coloring agent and an organic solvent to obtain ink. The resin particle can be synthesized or is available on the market. It is possible to synthesize the resin particle or obtain from market. These can be used alone or in combination of the resin particles.

The volume average particle diameter of the resin particle is not particularly limited and can be suitably selected to suit to a particular application. The volume average particle diameter is preferably from 10 through 1,000 nm, more preferably from 10 through 200 nm, and furthermore preferably from 10 through 100 nm to obtain good fixability and image hardness.

The volume average particle diameter can be measured by using a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from 1 through 30 percent by mass and more preferably from 5 through 20 percent by mass to the total content of the ink.

The particle diameter of the solid portion in ink has no particular limit and can be suitably selected to suit to a particular application. For example, the maximum frequency in the maximum number conversion is preferably from 20 through 1,000 nm and more preferably from 20 through 150 nm to ameliorate the discharging stability and image quality such as image density. The solid portion includes resin particles, particles of pigments, etc. The particle diameter of the solid portion can be measured by using a particle size analyzer (Nanotrac Wave-UT151, manufactured by MicrotracBEL Corp).

<Additive>

Ink may further optionally contain a surfactant, a defoaming agent, a preservative and fungicide, a corrosion inhibitor, a pH regulator, etc.

—Surfactant—

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application. Among silicone-based surfactants, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group as a modifying group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These fluoro surfactants are particularly preferable because these fluoro surfactants do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2 CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxy ethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These surfactants can be used alone or in combination.

The proportion of the surfactant in ink is not particularly limited and can be suitably selected to suit to a particular application. It is preferably from 0.001 through 5 percent by mass and more preferably from 0.05 through 5 percent by mass in terms of excellent wettability and discharging stability and improvement on image quality.

—Defoaming Agent—

The defoaming agent has no particular limit. For example, silicon-based defoaming agents, polyether-based defoaming agents, and aliphatic acid ester-based defoaming agents are suitable. These defoaming agents can be used alone or in combination. Of these defoaming agents, silicone-based defoaming agents are preferable to easily break foams.

—Preservatives and Fungicides—

The preservatives and fungicides are not particularly limited. A specific example is 1,2-benzisothiazolin-3-on.

—Corrosion Inhibitor—

The corrosion inhibitor has no particular limit. Examples thereof are acid sulfite and sodium thiosulfate.

—pH Regulator—

The pH regulator has no particular limit. It is preferable to adjust the pH to 7 or higher. Specific examples thereof include, but are not limited to, amines such as diethanol amine and triethanol amine.

The property of the ink is not particularly limited and can be suitably selected to suit to a particular application. For example, viscosity, surface tension, pH, etc., are preferably in the following ranges.

The viscosity of the ink at 25 degrees C. is preferably from 5 through 30 mPa·s and more preferably from 5 through 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms of that the ink is suitably levelized on a print medium and the drying time of the ink is shortened. The pH of the ink is preferably from 7 through 12 and more preferably from 8 through 11 in terms of prevention of corrosion of metal materials contacting the ink.

<Print Medium>

The print medium for use in printing is not particularly limited. Plain paper, gloss paper, special paper, cloth, etc. are usable. Also, good images can be formed on a non-permeating substrate.

The non-permeating substrate has a surface with low moisture permeability and absorbency and includes a material having myriad of hollow spaces inside but not open to the outside. To be more quantitative, the substrate has a water-absorption amount of 10 mL/m$^2$ or less between the contact and 30 msec$^{1/2}$ after the contact according to Bristow method.

For example, plastic films of polyvinyl chloride resin, polyethylene terephthalate (PET), polypropylene, polyethylene, and polycarbonate are suitably used for the non-permeating substrate.

The print medium is not limited to articles used as typical print media. It is suitable to use building materials such as wall paper and floor material, cloth for apparel such as T-shirts, textile, and leather as the print medium. In addition, the configuration of the paths through which the print medium is transferred can be adjusted to accommodate ceramics, glass, metal, etc.

<Printed Matter>

The printed matter of the present disclosure includes a print medium and an image formed on the print medium with the ink set of the present disclosure.

An inkjet printing device and an inkjet printing method are used to print the image on the print medium to obtain the printed matter.

(Liquid Discharging Device)

A liquid discharging device of the present disclosure includes a control unit configured to control the ink set of the present disclosure and the nozzle lines of an ink discharging unit in a manner that an auxiliary layer, which is a layer auxiliarily formed by discharging a liquid having a color different from process colors, can be deposited as any one selected from a preprint, a post-print, and an intermediate print with respect to an image layer, which is a layer of an image formed by discharging inks having the process colors for image formation. The liquid discharging device further includes other units as needed.

(Printing Method)

A printing method of the present disclosure includes a controlling step of controlling the ink set of the present disclosure and the nozzle lines of an ink discharging unit in a manner that an auxiliary layer, which is a layer auxiliarily formed by discharging a liquid having a color different from process colors, can be deposited as any one selected from a preprint, a post-print, and an intermediate print with respect to an image layer, which is a layer of an image formed by discharging inks having the process colors for image formation. The printing method further includes other steps as needed.

<Recording Device>

FIG. 1 is an exemplary view illustrating the configuration of an inkjet recording device 1. The inkjet recording device 1 serving as a printer is a serial-type inkjet recording device. As illustrated in FIG. 1, the inkjet recording device 1 includes an image forming unit 2 configured to print a desired image, a dryer 3, a roll medium compartment 4, and a conveying mechanism 5. The roll medium compartment 4 is configured to store a roll medium (print medium) 40. The roll medium compartment 4 can store print media 40 varied in size in the width direction. The print medium 40 may be an impermeable medium such as a polyvinyl chloride (PVC)

or polyethylene terephthalate (PET) film, or a permeable medium such as cloth or synthetic paper.

The conveying mechanism 5 constitutes a roll-to-roll conveying unit. The conveying mechanism 5 includes a pair of nip rollers 51, a pair of driven rollers 52, and a takeup roller 53 on a conveying path 54 of the print medium 40. The nip rollers 51 are disposed at the anterior side of the image forming unit 2 (i.e., at the upstream in the conveying direction A). The nip rollers 51 are configured to rotate along with being driven by a motor to convey the print medium 40 nipped between the nip rollers 51 toward the image forming unit 2. The takeup roller 53 is configured to rotate along with being driven by a motor M to wind up the print medium 40 to which a print has been applied. The driven rollers 52 are configured to rotate, being driven along with conveying of the print medium 4.

The conveying mechanism 5 includes a wheel encoder configured to detect a conveying speed. The conveying speed of the conveying mechanism 5 is controlled in accordance with being controlled by a motor based on a detected speed value obtained by sampling an intended value and a detected pulse from the wheel encoder 55.

That is, the print media 40 stored in the roll medium compartment 4 is conveyed to the image forming unit 2 via the driven roller 52 by means of rotation of the nip rollers 51. The image forming unit 2 is configured to print a desired image over the print medium 40 that has arrived at the image forming unit 2. The print medium 40 to which the print has been applied is wound up by means of rotation of the takeup roller 53.

The image forming unit 2 includes a carriage 21. The carriage 21 is held slidably on guide rods (guide rails) 22. The carriage 21 is configured to move on the guide rods (guide rails) 22 in a direction (main scanning direction) perpendicular to the conveying direction A of the print medium 40 along with being driven by a motor. More specifically, the carriage 21 is configured to reciprocably move within a print range in which the image forming unit 2 can apply printing to the print medium 40 conveyed by the conveying mechanism 5, within a main scanning range, which is a movable range in the main scanning direction.

The carriage 21 is mounted with a recording head 20 provided with a plurality of lines of nozzle holes serving as discharging ports through which liquid droplets are discharged. The recording head 20 is integrally equipped with tanks from which inks are supplied into the recording head 20. However, the recording head 20 is not limited to the configuration integrally equipped with tanks, but may have tanks as separate components. The recording head 20 functions as a liquid discharging unit and is configured to discharge ink droplets of each of black (K), yellow (Y), magenta (M), and cyan (C) colors, which are printing liquids of process colors. Black (K), yellow (Y), magenta (M), and cyan (C) are image forming inks.

The image forming unit 2 includes a platen 23 configured to support the print medium 40 below the recording head 20 during printing by the recording head 20.

The image forming unit 2 includes an encoder sheet configured to sense the main scanning position of the carriage 21 along the main scanning direction of the carriage 21. The carriage 21 includes an encoder. The image forming unit 2 is configured to sense the main scanning position of the carriage 21 by causing the encoder of the carriage 21 to read the encoder sheet.

The carriage 21 includes a sensor 24 configured to optically sense end portions of the print medium 40 along with movement of the carriage 21. A sensing signal from the sensor 24 is used for calculating the positions of the end portions of the print medium 40 in the main scanning direction and the width of the print medium 40.

The dryer 3 includes a pre-heater 30, a platen heater 31, a drying heater 32, and a hot air fan 33. The pre-heater 30, the platen heater 31, and the drying heater 32 are, for example, electro-thermal heaters using ceramic or nichrome wires.

The pre-heater 30 is disposed at the upstream of the image forming unit 2 in the conveying direction A of the print medium 40. The pre-heater 30 is configured to preparatively heat the print medium 40 conveyed by the conveying mechanism 5.

The platen heater 31 is disposed on the platen 23. The platen heater 31 is configured to heat the print medium 40 on which ink droplets jetted through nozzle holes of the recording head 20 are landed.

The drying heater 32 is disposed at the downstream of the image forming unit 2 in the conveying direction A of the print medium 40. The drying heater 32 is configured to successively heat the print medium 40 to which a print has been applied by the image forming unit 2 to promote drying of the ink droplets having landed.

The hot air fan 33 is disposed at the downstream of the drying heater 32 (or the image forming unit 2) in the conveying direction A of the print medium 40. The hot air fan 33 is configured to blow the print surface of the print medium landed on by inks with hot air. The hot air fan 33 is configured to reduce the humidity of the atmosphere around the print surface of the print medium 40 and completely dry the print surface by directly blowing the inks over the print surface of the print medium 40 with hot air.

The inkjet recording device 1 mounted with this type of the dryer 3 can employ as the print medium 40, impermeable media that are not permeated by inks, such as polyvinyl chloride films, polyethylene terephthalate (PET) films, and acrylic films.

The inkjet recording device 1 configured to form images by causing the recording head 20 to discharge inks while causing the carriage 21 to reciprocably move by the width of the print medium 40 has unidirectional printing of forming images by discharging inks only when the carriage moves on the out-bound path, and bidirectional printing of forming images by discharging inks both when the carriage moves on the out-bound path and when the carriage moves on the in-bound path. The inkjet recording device 1 mainly employs bidirectional printing that is advantageous in terms of printing speed. Here, an operation of the recording head 20 to discharge inks while the carriage 21 is moving in the main scanning direction is referred to as one scan.

Reference may be made to the description in Japanese Unexamined Patent Application Publication No. 2017-105193, regarding the control system of the inkjet recording device 1.

Next, the control system of an inkjet recording device 1 will be described. FIG. 3 is a block diagram illustrating the control system of the inkjet recording device 1.

As illustrated in FIG. 3, the inkjet recording device 1 includes a control unit 10 configured to control the device on the whole. The control unit 10 includes a CPU (Central Processing Unit) 11, a ROM (Read Only memory) 12, a RAM (Random Access Memory) 13, a memory 14, and an ASIC (Application Specific Integrated Circuit) 15. The ROM 12 is configured to store computer programs executed by the CPU 11 and other fixed data. The RAM 13 is configured to temporarily store, for example, image data. The memory 14 is a rewritable nonvolatile memory configured to retain data even while the power supply to the inkjet recording device 1 is cut off. The ASIC 15 is configured to execute image processing for performing, for example, various signal processes and sorting to image data, and process input/output signals for controlling the device on the whole.

As illustrated in FIG. 3, the control unit 10 includes a host interface (I/F) 16, a head driving control unit 17, a motor control unit 18, and an I/O 19.

The host I/F 16 is configured to exchange image data (print data) and control signals with a host through a cable or a network. Examples of the host coupled to the inkjet recording device 1 include information processing apparatuses such as personal computers, image reading devices such as image scanners, and image capturing devices such as digital cameras.

The I/O 19 is configured to receive detection pulses from an encoder 26 and a wheel encoder 55. In addition, a sensor 24, and various sensors 25 such as a humidity sensor, a temperature sensor, and other sensors are coupled to the I/O 19. The I/O 19 is configured to receive sensing signals from the sensors 24 and the various sensors 25.

The head driving control unit 17 is configured to control driving of the recording head 20, and includes a data transfer unit. More specifically, the head driving control unit 17 is configured to transfer image data in the form of serial data. The head driving control unit 17 is configured to generate transfer clocks and latch signals needed for transferring image data and securing transfer, and driving waveforms used when discharging liquid droplets from the recording head 20. The head driving control unit 17 is configured to input, for example, the generated driving waveforms to the driving circuit in the recording head 20.

The motor control unit 18 is configured to drive a motor M. More specifically, the motor control unit 18 is configured to calculate a control value based on an intended value sent from the CPU 11 and a detected speed obtained by sampling a detection pulse from the wheel encoder 55. The motor control unit 18 is configured to drive the motor M based on the calculated control value via an internal motor driving circuit.

The control unit 10 includes a heater control unit 8 and a hot air fan control unit 9.

The heater control unit 8 is configured to control the output powers of the pre-heater 30, the platen heater 31, and the drying heater 32 such that the temperatures of the heaters 30, 31, and 32 become the set temperatures. More specifically, the heater control unit 8 is configured to acquire temperature information by means of the temperature sensors provided on the heaters 30, 31, and 32 when controlling the heaters 30, 31, and 32. The heater control unit 8 is configured to control the temperatures of the heaters 30, 31, and 32 to be the set temperatures while monitoring the temperatures of the heaters 30, 31, and 32. When heaters are provided in the tanks of the recording head 20 and on the ink path, the heater control unit 8 controls these heaters likewise.

The hot air fan control unit 9 is configured to control the output power of the hot air fan 33 such that air having a predetermined temperature is sent in a predetermined air volume.

An operation panel 60 configured to receive and display needed information of the inkjet recording device 1 is coupled to the control unit 10.

The control unit 10 is configured to comprehensively control each unit, with the CPU 11 developing and executing the computer programs read out from the ROM 12 (or the memory 14) in the RAM 13.

The computer programs executed by the inkjet recording device 1 of the present disclosure are made available by being recorded in a computer-readable recording medium such as a CD-ROM, a flexible disk (FD), a CD-R, and a DVD (Digital Versatile Disk) in the form of files in installable or executable formats.

Alternatively, the computer programs executed by the inkjet recording device 1 of the present disclosure may be stored in a computer coupled to a network such as the Internet, and made available through downloading through a network. The computer programs executed by the inkjet recording device 1 of the present embodiment may be made available or distributed through a network such as the Internet.

The computer programs executed by the inkjet recording device 1 of the present disclosure may be made available by being previously embedded in, for example, a ROM.

Next, an image data transferring/printing process executed by the control unit 10 of the inkjet recording device 1 will be briefly described. The CPU 11 of the control unit 10 reads out image data (print data) from a receiving buffer in the host I/F 16, analyzes the image data (print data), and performs, for example, needed image processing or data sorting process in the ASIC 15. Next, the CPU 11 of the control unit 10 transfers the image data (print data) processed by the ASIC 15 to the recording head 20 via the head driving control unit 17.

Dot pattern data for outputting the image may be generated, for example, by means of font data stored in the ROM 12, or image data may be developed into bit map data by means of a printer driver of the host and transferred to the inkjet recording device 1.

Next, the characteristic functions of the inkjet recording device 1 will be described. The inkjet recording device 1 of the present embodiment has the following characteristics in terms of inkjet printing on a print medium 40, which is a transparent impermeable medium.

In sum, the inkjet recording device 1 can deposit an auxiliary layer, which is a layer auxiliarily formed of an auxiliary ink (for example, a white ink), as a preprint, a post-print, or an intermediate print with respect to an image layer, which is a layer of an image formed of image forming inks, and can form the auxiliary layer at a high speed.

Next, a liquid discharging head (hereinafter may also referred to as "recording head") of the inkjet recording device 1 will be described.

The ink set of the present disclosure can be suitably used in a liquid discharging head provided with three or more nozzle lines, which are arrangements, in the sub-scanning direction perpendicular to the main scanning direction, of a plurality of nozzle holes through which at least one kind of an ink selected from an ink containing a cyan pigment, an ink containing a magenta pigment, and an ink containing an yellow pigment is discharged.

FIG. 2 is a plan view illustrating a nozzle configuration of the recording head 20. FIG. 2 is a transparent top view of the nozzle lines of the recording head 20. As illustrated in FIG. 2, the recording head 20 includes a first nozzle group 20a, a second nozzle group 20b, and a third nozzle group 20c.

FIG. 2 illustrates an example in which the nozzle groups 20a, 20b, and 20c are arranged on two lines arranged side by side in the main scanning direction, and are staggered in the sub-scanning direction. That is, the nozzle groups 20a, 20b, and 20c are arranged in the order of the third nozzle group 20c, the second nozzle group 20b, and the first nozzle group 20a from the upstream to the downstream in the conveying direction A of the print medium 40 in a manner that the nozzle lines do not overlap. FIG. 2 illustrates an example in which the second nozzle group 20b is provided at a position shifted from the first nozzle group 20a and the third nozzle group 20c in the main scanning direction.

The first nozzle group 20a, the second nozzle group 20b, and the third nozzle group 20c each include four nozzle lines for discharging droplets of black (K), yellow (Y), magenta (M), and cyan (C) inks, which are printing liquids of process colors for image formation. Each nozzle line includes 192 nozzle holes from a nozzle hole of nozzle No. 1 to a nozzle hole of nozzle No. 192. In the example illustrated in FIG. 2, the nozzle holes are numbered nozzle No. 1 to nozzle No. 192 in the order of the nozzle holes at the downstream side to the nozzle holes at the upstream side in the conveying direction A of the print medium 40. In this example, the pitch P between the nozzle holes is 150 dpi (dots per inch).

As illustrated in FIG. 2, the first nozzle group 20a, the second nozzle group 20b, the third nozzle group 20c each include a cyan pigment-containing ink nozzle line NC for discharging ink droplets of cyan (C), a magenta pigment-containing ink nozzle line NM for discharging ink droplets of magenta (M), a yellow pigment-containing ink nozzle line NY for discharging ink droplets of yellow (Y), and a black pigment-containing ink nozzle line NK for discharging ink droplets of black (K).

The second nozzle group 20b also include four nozzle lines each including 192 nozzle holes of nozzle No. 1 to nozzle No. 192, like the first nozzle group 20a. In this example, the second nozzle group 20b also has a pitch P of 150 dpi between the nozzle holes, like the first nozzle group 20a.

As described above, the nozzle groups 20a, 20b, and 20c have the same number of nozzle lines and the same number of nozzles. This makes it possible to constitute the nozzle groups 20a, 20b, and 20c by the same component, making it possible to reduce the number of kinds of components and save the cost of the device.

In the present embodiment, the nozzle lines of the nozzle groups 20a, 20b, and 20c are laid along the conveying direction A of the print medium 40. However, the nozzle lines may be laid inclined from the conveying direction A.

FIG. 2 illustrates an example in which the first nozzle group 20a, the second nozzle group 20b, and the third nozzle group 20c are each provided with the cyan pigment-containing ink nozzle line NC for discharging ink droplets of cyan (C), the magenta pigment-containing ink nozzle line NM for discharging ink droplets of magenta (M), a yellow pigment-containing ink nozzle line NY for discharging ink droplets of yellow (Y), and a black pigment-containing ink nozzle line NK for discharging ink droplets of black (K). However, this example is non-limiting. Among the first nozzle group 20a, the second nozzle group 20b, and the third nozzle group 20c, the first nozzle group 20a may include nozzles, all of which are magenta pigment-containing ink nozzles, the second nozzle group 20b may include nozzles, all of which are yellow pigment-containing ink nozzles, and the third nozzle group 20c may include nozzles, all of which are cyan pigment-containing ink nozzles.

The ink set of the present disclosure can overcome the problem of the present disclosure of color variation.

Although the inks used in the ink set of the present disclosure have low pigment content ratios, increasing the number of droplets to be discharged can increase the amounts of the pigments to be deposited, making it possible to overcome color variation.

Moreover, two sets of each nozzle group of FIG. 2 may be combined, to provide six or more nozzle lines. The configuration including six or more nozzle lines can operate at an even higher speed.

FIG. 4 is a plan view illustrating a nozzle configuration of the recording head 20. FIG. 5 is an exemplary view illustrating color combination of each nozzle line in a simplified manner. FIG. 4 is a transparent top view of the nozzle lines of the recording head 20. As illustrated in FIG. 4, the recording head 20 includes a first nozzle group 20a, a second nozzle group 20b, and a third nozzle group 20c.

As illustrated in FIG. 4, the nozzle groups 20a, 20b, and 20c are arranged on two lines arranged side by side in the main scanning direction, and are staggered in the sub-scanning direction. That is, the nozzle groups 20a, 20b, and 20c are arranged in the order of the third nozzle group 20c, the second nozzle group 20b, and the first nozzle group 20a from the upstream to the downstream in the conveying direction A of the print medium 40 in a manner that the nozzle lines do not overlap. As illustrated in FIG. 4, the second nozzle group 20b is provided at a position shifted from the first nozzle group 20a and the third nozzle group 20c in the main scanning direction.

The first nozzle group 20a and the third nozzle group 20c include one nozzle line for discharging ink droplets of an auxiliary ink (an ink for background or an ink for foundation) and three nozzle lines for discharging ink droplets of CMY (process colors) for image formation. Each nozzle line includes 192 nozzle holes from a nozzle hole of nozzle No. 1 to a nozzle hole of nozzle No. 192. In the example illustrated in FIG. 4, the nozzle holes are numbered nozzle No. 1 to nozzle No. 192 in the order of the nozzle holes at the downstream side to the nozzle holes at the upstream side in the conveying direction A of the print medium 40. The pitch P between the nozzle holes is 150 dpi (dots per inch).

As illustrated in FIG. 4, the first nozzle group 20a and the third nozzle group 20c each include a cyan ink nozzle line NC for discharging ink droplets of cyan (C), a magenta ink nozzle line NM for discharging ink droplets of magenta (M), and a yellow ink nozzle line NY for discharging ink droplets of yellow (Y).

The second nozzle group 20b also include four nozzle lines each including 192 nozzle holes of nozzle No. 1 to nozzle No. 192, like the first nozzle group 20a. The second nozzle group 20b also has a pitch P of 150 dpi between the nozzle holes, like the first nozzle group 20a.

The second nozzle group 20b includes a nozzle line for auxiliary recording. Specifically, the second nozzle group 20b includes one nozzle line for discharging ink droplets of an auxiliary ink (an ink for background or an ink for foundation), two nozzle lines for discharging ink droplets of spot colors for image formation, and one nozzle line for discharging ink droplets of K (process color) for image formation.

As illustrated in FIG. 5, the second nozzle group 20b includes a nozzle line NW for discharging ink droplets of white (W), as an example of the auxiliary ink (ink for background or an ink for foundation). The second nozzle group 20b includes a nozzle line NO for discharging ink droplets of orange (O) and a nozzle line NG for discharging ink droplets of green (G) as an example of inks having the spot colors for image formation. The second nozzle group 20b further includes a nozzle line NK for discharging ink droplets of black (K).

As described above, the nozzle groups 20a, 20b, and 20c have the same number of nozzle lines and the same number of nozzles. This makes it possible to constitute the nozzle groups 20a, 20b, and 20c by the same component, making it possible to reduce the number of kinds of components and save the cost of the device.

In the present embodiment, a white ink, an orange ink, and a green ink are described as the liquid having a color different from process colors, as illustrated in FIG. 4. However, the liquid having a color different from process colors is not limited to the above. For example, spot color inks such as red and blue, a silver ink, a gold ink, a transparent ink, a primer, and a surface protective agent can be employed as needed. These inks are used for enhancing the image quality or adding a texture.

For example, in printing over a transparent base material, a white ink may be printed over the base material, and inks having hues such as process colors may be printed over the white ink. As a result, an image having a white background can be formed over the transparent base material.

Alternatively, inks having hues such as process colors may be printed, and a white ink may be printed over the process colors. As a result, an image having a white background when seen from the base material side can be formed.

Alternatively, inks having hues such as process colors may be printed, a white ink may be printed over the process colors, and inks having hues such as process colors may be again printed over the white ink. As a result, different images can be formed on different sides with a white background.

In the present embodiment, the nozzle lines of the nozzle groups 20a, 20b, and 20c are laid along the conveying direction A of the print medium 40. However, the nozzle lines may be laid inclined from the conveying direction A.

The terms such as image formation, recording, and printing as used herein all have the same meaning.

The terms such as print media, media, and printed matters all have the same meaning.

EXAMPLES

The present disclosure will be described below by way of Examples. The present disclosure should not be construed as being limited to these Examples.

Pigment Dispersion Production Example 1

<Production of Cyan Pigment Dispersion>

A cyan pigment dispersion was obtained in the same manner as the method described in the section "Method A for [pigment surface reforming treatment]" of Japanese Unexamined Patent Application Publication No. 2012-207202.

Specifically, C.I. Pigment Blue 15:3 (product name: CHROMOFINE BLUE, available from Dainichiseika Color & Chemicals Mfg. Co., Ltd.) (20 g), the compound represented by structural formula (1) below (20 mmol), and ion-exchanged water (200 mL) were mixed using a Silverson mixer (6,000 rpm) in an environment at room temperature (25 degrees C.), to obtain a slurry. When it was the case that the obtained slurry had a pH level of higher than 4, nitric acid (20 mmol) was added to the slurry. Thirty minutes later, sodium nitrite (20 mmol) dissolved in a low amount of ion-exchanged water was slowly added to the slurry. Then, the slurry was heated to 60 degrees C. while being stirred, and allowed to undergo reaction for 1 hour, to obtain a reformed pigment, which was the aforementioned C.I. Pigment Blue 15:3 having the compound of structural formula (1) below added on the surface.

Next, using a NaOH aqueous solution, the obtained reformed pigment was adjusted to a pH level of 10, to obtain a reformed pigment dispersion thirty minutes later. The reformed pigment dispersion and ion-exchanged water were subjected to ultrafiltration using a dialysis membrane, and then subjected to ultrasonic dispersion, to obtain a cyan pigment dispersion (self-dispersible type) having a pigment concentration of 15% by mass and including a bisphosphonic acid group as a hydrophilic functional group.

[Chem. 1]

Structural formula (1)

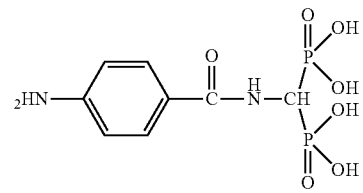

Pigment Dispersion Production Example 2

<Production of Magenta Pigment Dispersion>

A magenta pigment dispersion having a pigment concentration of 15% by mass was produced in the same manner as in Pigment dispersion production example 1, except that unlike in Pigment dispersion production example 1, C.I. Pigment Blue 15:3 (product name: CHROMOFINE BLUE, available from Dainichiseika Color & Chemicals Mfg. Co., Ltd.) (20 g) was changed to C.I. Pigment Red 122 (product name: TONER MAGENTA E002, available from Clariant Japan K.K.) (20 g).

Pigment Dispersion Production Example 3

<Production of Yellow Pigment Dispersion>

A yellow pigment dispersion having a pigment concentration of 15% by mass was produced in the same manner as in Pigment dispersion production example 1, except that unlike in Pigment dispersion production example 1, C.I. Pigment Blue 15:3 (product name: CHROMOFINE BLUE, available from Dainichiseika Color & Chemicals Mfg. Co., Ltd.) (20 g) was changed to C.I. Pigment Yellow 74 (product name: FAST YELLOW 531, available from Dainichiseika Color & Chemicals Mfg. Co., Ltd.) (20 g).

Pigment Dispersion Production Example 4

<Production of Black Pigment Dispersion>

A black pigment dispersion (with a pigment solid concentration of 15% by mass) was produced in the same manner as in Pigment dispersion production example 1, except that unlike in Pigment dispersion production example 1, Pigment Blue 15:3 (product name: LIONOL BLUE FG-7351, available from Tokyo Ink Co., Ltd.) was changed to a carbon black pigment (product name: MONARCH 800, available from Cabot Corporation).

Pigment Dispersion Production Example 5

<Production of White Pigment Dispersion>
Titanium oxide (product name: STR-100 W available from Sakai Chemical Industry Co., Ltd.) (25 parts by mass), a pigment dispersant (Product name: TEGO DISPERS 651 available from Evonik Japan Co., Ltd.) (5 parts by mass), and water (70 parts by mass) were mixed, and subjected to dispersion treatment at 8 m/s for 5 minutes using a bead mill (product name: RESEARCH LABO, available from Shinmaru Enterprises Corporation) packed at a ratio of 60% with zirconia beads having a diameter of 0.3 mm, to obtain a white pigment dispersion (a pigment solid concentration of 25% by mass).

Example 1

<Preparation of Ink Set 1>
A cyan pigment-containing ink 1, a magenta pigment-containing ink 1, a yellow pigment-containing ink 1, a black pigment-containing ink 1, and a white pigment-containing ink 1 produced in the manner described below were combined as an ink set 1.

—Production of Cyan Pigment-Containing Ink—
The cyan pigment dispersion (7% by mass), 1,3-butanediol (product name: 1,3-BUTANEDIOL, available from Daicel Chemical Industries, Ltd., with a SP value of 12.8) (20% by mass), 3-methoxy-N,N-dimethyl propionamide (product name: EQUAMIDE M-100, available from Idemitsu Kosan Co., Ltd., with a SP value of 9.2) (10% by mass), diethylene glycol diethyl ether (product name: HISOLVE EDE, available from Toho Chemical Industry Co. Ltd., with a SP value of 8.2) (5% by mass), triethylene glycol butyl methyl ether (product name: HISOLVE BTM, available from Toho Chemical Industry Co., Ltd., with a SP value of 8.4) (5% by mass), a polycarbonate urethane resin particle liquid (TAKELAC W6110, available from Mitsui Chemicals, Inc., with a solid concentration of 30% by mass) (10% by mass), a siloxane compound (product name: FZ2110, available from Dow Corning Toray Co., Ltd., with an effective component concentration of 100% by mass) (1% by mass), and ion-exchanged water as a balance to total to 100% by mass were mixed and stirred, and subsequently filtrated through a membrane filter having an average pore diameter of 0.8 micrometers (product name: DISMIC-25CS, available from Advantech Co., Ltd.), to obtain a cyan pigment-containing ink 1.

—Production of Magenta Pigment-Containing Ink—
A magenta pigment-containing ink 1 was obtained in the same manner as in Production of cyan pigment-containing ink, except that unlike in Production of cyan pigment-containing ink, the cyan pigment dispersion (7% by mass) was changed to the magenta pigment dispersion (20% by mass).

—Production of Yellow Pigment-Containing Ink—
A yellow pigment-containing ink 1 was obtained in the same manner as in Production of cyan pigment-containing ink, except that unlike in Production of cyan pigment-containing ink, the cyan pigment dispersion (7% by mass) was changed to the yellow pigment dispersion (13% by mass).

—Production of Black Pigment-Containing Ink—
A black pigment-containing ink 1 was obtained in the same manner as in Production of cyan pigment-containing ink, except that unlike in Production of cyan pigment-containing ink, the cyan pigment dispersion (7% by mass) was changed to the black pigment dispersion (15% by mass).

—Production of White Pigment-Containing Ink—
A white pigment-containing ink 1 was obtained in the same manner as in Production of cyan pigment-containing ink, except that unlike in Production of cyan pigment-containing ink, the cyan pigment dispersion (7% by mass) was changed to the white pigment dispersion (15% by mass).

Examples 2 to 20 and Comparative Examples 1 to 10

Ink sets 2 to 30 of Examples 2 to 20 and Comparative Examples 1 to 10 were obtained in the same manner as in Example 1, except that unlike in Example 1, the compositions and proportions of the cyan pigment-containing ink 1, the magenta pigment-containing ink 1, and the yellow pigment-containing ink 1 were changed to the compositions and proportions presented in Table 1 to Table 13.

<Image Formation>
Using each ink set obtained and the printer illustrated in FIG. 1 including the liquid discharging unit illustrated in FIG. 2 or FIG. 4, printing was applied on either polyvinyl chloride (PVC) (product name: GIY-11Z5, available from LINTEC Corporation) or cloth (product name: SS8000, available from SEIREN Co., Ltd.) as presented in Table 1 to Table 13 at a printing speed of 25 m$^2$/h.

As illustrated in FIG. 4, the liquid discharging unit of the inkjet recording device illustrated in FIG. 1 includes a plurality of nozzle groups each including at least one nozzle line, which is an arrangement, in a sub-scanning direction perpendicular to a main scanning direction, of a plurality of nozzle holes through which a liquid having a process color for image formation is discharged, and at least one nozzle line, which is an arrangement, in the sub-scanning direction, of a plurality of nozzle holes through which a liquid having a color different from process colors is discharged, with the plurality of nozzle groups disposed such that three or more of the nozzle line for discharging the liquid having a color different from process colors are arranged side by side in the sub-scanning direction.

In the first nozzle group 20a and the third nozzle group 20c illustrated in FIG. 4, the "white ink", the "cyan ink", the "magenta ink", and the "yellow ink" of each ink set were used in "NW", "NC", "NM", and "NY".

In the second nozzle group 20b illustrated in FIG. 4, the "white ink" and the "black ink" of each ink set were used in "NW" and "NK".

In Examples 1 to 13 and Comparative Examples 1 to 6, no black pigment-containing ink was loaded and printed, and images were formed with three colors of inks including the yellow pigment-containing ink, the magenta pigment-containing ink, and the cyan pigment-containing ink. That is, in the liquid discharging unit of the inkjet recording device illustrated in FIG. 1, the "cyan pigment-containing ink", the "magenta pigment-containing ink", and the "yellow pigment-containing ink" of each ink set were used in "NC", "NM", and "NY" of the first nozzle group 20a to the third nozzle group 20c, and no "black pigment-containing ink" was used in "NK", as illustrated in FIG. 2. Each image generated was evaluated in terms of "image color variation" in the manner described below. The results are presented in Table 1 to Table 13.

<Image Color Variation>
The output image was a 4C composite image varied in tone from 100% solid chart to 0%. The 4C composite image was visually observed to evaluate image color variation according to the criteria described below. The grade 2 or higher are practically usable levels.
<Evaluation Criteria>
5: No color variation was recognized at a distance of less than 30 cm from the image.
4: No color variation was recognized at a distance of 30 cm or greater but less than 1 m from the image.
3: No color variation was recognized at a distance of 1 m or greater but less than 2 m from the image.
2: No color variation was recognized at a distance of 2 m or greater but less than 3 m from the image.
1: Color variation was recognized at a distance of 3 m or greater from the image.

TABLE 1

|  |  | Ex. 1 | | | Ex. 2 | | | Ex. 3 | | |
|---|---|---|---|---|---|---|---|---|---|---|
|  |  | C | M | Y | C | M | Y | C | M | Y |
| Coloring Material | Cyan pigment dispersion (pigment concentration: 15% by mass) | 6.7 |  |  | 8.0 |  |  | 4.7 |  |  |
|  | Magenta pigment dispersion (pigment concentration: 15% by mass) |  | 20.0 |  |  | 23.3 |  |  | 21.0 |  |
|  | Yellow pigment dispersion (pigment concentration: 15% by mass) |  |  | 13.0 |  |  | 20.0 |  |  | 13.3 |
| Organic Solvent | 1,3-Butanediol (SP value: 12.8) | 20.0 | 20.0 | 20.0 | 20.0 | 20.0 | 20.0 | 20.0 | 20.0 | 20.0 |
|  | 3-Methoxy-N,N-dimethyl propionamide (SP value: 9.2) | 10.0 | 10.0 | 10.0 | 10.0 | 10.0 | 10.0 | 10.0 | 10.0 | 10.0 |
|  | Diethylene glycol diethyl ether (SP value: 8.2) | 5.0 | 5.0 | 5.0 | 5.0 | 5.0 | 5.0 | 5.0 | 5.0 | 5.0 |
|  | Triethylene glycol butyl methyl ether (SP value: 8.4) | 5.0 | 5.0 | 5.0 | 5.0 | 5.0 | 5.0 | 5.0 | 5.0 | 5.0 |
| Resin particles | Polycarbonate urethane resin particle liquid (solid concentration: 30% by mass) | 10.0 | 10.0 | 10.0 | 10.0 | 10.0 | 10.0 | 10.0 | 10.0 | 10.0 |
| Surfactant | Siloxane compound (effective component concentration: 100% by mass) | 1.0 | 1.0 | 1.0 | 1.0 | 1.0 | 1.0 | 1.0 | 1.0 | 1.0 |
| Water | Ion-exchanged water | balance | balance | balance | balance | balance | balance | balance | balance | balance |
|  | Total (% by mass) | 100.0 | 100.0 | 100.0 | 100.0 | 100.0 | 100.0 | 100.0 | 100.0 | 100.0 |
|  | Cyan pigment proportion (% by mass) | 1.00 |  |  | 1.20 |  |  | 0.70 |  |  |
|  | Magenta pigment proportion (% by mass) |  | 3.00 |  |  | 3.50 |  |  | 3.15 |  |
|  | Yellow pigment proportion (% by mass) |  |  | 2.00 |  |  | 3.00 |  |  | 2.00 |
|  | Magenta pigment proportion/cyan pigment proportion (times) |  | 3.0 |  |  | 2.9 |  |  | 4.5 |  |
|  | Yellow pigment proportion/cyan pigment proportion (times) |  | 2.0 |  |  | 2.5 |  |  | 2.9 |  |
|  | Proportion of water | balance | balance | balance | balance | balance | balance | balance | balance | balance |
|  | Proportion of organic solvent with SP value of 10 or less (% by mass) | 20.0 | 20.0 | 20.0 | 20.0 | 20.0 | 20.0 | 20.0 | 20.0 | 20.0 |
|  | Kind of print medium |  | PVC |  |  | PVC |  |  | PVC |  |
| Evaluation result | Color variation |  | 5 |  |  | 5 |  |  | 5 |  |

TABLE 2

|  |  | Ex. 4 | | | Ex. 5 | | | Ex. 6 | | |
|---|---|---|---|---|---|---|---|---|---|---|
|  |  | C | M | Y | C | M | Y | C | M | Y |
| Coloring Material | Cyan pigment dispersion (pigment concentration: 15% by mass) | 9.3 |  |  | 8.0 |  |  | 8.0 |  |  |
|  | Magenta pigment dispersion (pigment concentration: 15% by mass) |  | 17.3 |  |  | 23.3 |  |  | 23.3 |  |
|  | Yellow pigment dispersion (pigment concentration: 15% by mass) |  |  | 13.3 |  |  | 20.0 |  |  | 20.0 |
| Organic Solvent | 1,3-Butanediol (SP value: 12.8) | 20.0 | 20.0 | 20.0 | 20.0 | 20.0 | 20.0 | 25.0 | 25.0 | 25.0 |
|  | 3-Methoxy-N,N-dimethyl propionamide (SP value: 9.2) | 10.0 | 10.0 | 10.0 | 10.0 | 10.0 | 10.0 | 5.0 | 5.0 | 5.0 |
|  | Diethylene glycol diethyl ether (SP value: 8.2) | 5.0 | 5.0 | 5.0 | 10.0 | 10.0 | 10.0 | 10.0 | 10.0 | 10.0 |
|  | Triethylene glycol butyl methyl ether (SP value: 8.4) | 5.0 | 5.0 | 5.0 | 5.0 | 5.0 | 5.0 |  |  |  |
| Resin particles | Polycarbonate urethane resin particle liquid (solid concentration: 30% by mass) | 10.0 | 10.0 | 10.0 | 10.0 | 10.0 | 10.0 | 10.0 | 10.0 | 10.0 |

TABLE 2-continued

|  |  | Ex. 4 | | | Ex. 5 | | | Ex. 6 | | |
| --- | --- | --- | --- | --- | --- | --- | --- | --- | --- | --- |
|  |  | C | M | Y | C | M | Y | C | M | Y |
| Surfactant | Siloxane compound (effective component concentration: 100% by mass) | 1.0 | 1.0 | 1.0 | 1.0 | 1.0 | 1.0 | 1.0 | 1.0 | 1.0 |
| Water | Ion-exchanged water | balance | balance | balance | balance | balance | balance | balance | balance | balance |
|  | Total (% by mass) | 100.0 | 100.0 | 100.0 | 100.0 | 100.0 | 100.0 | 100.0 | 100.0 | 100.0 |
|  | Cyan pigment proportion (% by mass) | 1.40 |  |  | 1.20 |  |  | 1.20 |  |  |
|  | Magenta pigment proportion (% by mass) |  | 2.60 |  |  | 3.50 |  |  | 3.50 |  |
|  | Yellow pigment proportion (% by mass) |  |  | 2.00 |  |  | 3.00 |  |  | 3.00 |
|  | Magenta pigment proportion/cyan pigment proportion (times) |  | 1.9 |  |  | 2.9 |  |  | 2.9 |  |
|  | Yellow pigment proportion/cyan pigment proportion (times) |  | 1.4 |  |  | 2.5 |  |  | 2.5 |  |
|  | Proportion of water | balance | balance | balance | balance | balance | balance | balance | balance | balance |
|  | Proportion of organic solvent with SP value of 10 or less (% by mass) | 20.0 | 20.0 | 20.0 | 25.0 | 25.0 | 25.0 | 15.0 | 15.0 | 15.0 |
|  | Kind of print medium |  | PVC |  |  | PVC |  |  | Cloth |  |
| Evaluation result | Color variation |  | 3 |  |  | 3 |  |  | 4 |  |

TABLE 3

|  |  | Ex. 7 | | | Ex. 8 | | | Ex. 9 | | |
| --- | --- | --- | --- | --- | --- | --- | --- | --- | --- | --- |
|  |  | C | M | Y | C | M | Y | C | M | Y |
| Coloring Material | Cyan pigment dispersion (pigment concentration: 15% by mass) | 8.0 |  |  | 5.3 |  |  | 5.3 |  |  |
|  | Magenta pigment dispersion (pigment concentration: 15% by mass) |  | 23.3 |  |  | 21.3 |  |  | 21.3 |  |
|  | Yellow pigment dispersion (pigment concentration: 15% by mass) |  |  | 20.0 |  |  | 13.3 |  |  | 13.3 |
| Organic Solvent | 1,3-Butanediol (SP value: 12.8) | 20.0 | 20.0 | 20.0 | 25.0 | 25.0 | 25.0 | 20.0 | 20.0 | 20.0 |
|  | 3-Methoxy-N,N-dimethyl propionamide (SP value: 9.2) | 10.0 | 10.0 | 10.0 | 10.0 | 10.0 | 10.0 | 5.0 | 5.0 | 5.0 |
|  | Diethylene glycol diethyl ether (SP value: 8.2) | 10.0 | 10.0 | 10.0 | 10.0 | 10.0 | 10.0 | 5.0 | 5.0 | 5.0 |
|  | Triethylene glycol butyl methyl ether (SP value: 8.4) | 5.0 | 5.0 | 5.0 | 5.0 | 5.0 | 5.0 | 5.0 | 5.0 | 5.0 |
| Resin particles | Polycarbonate urethane resin particle liquid (solid concentration: 30% by mass) | 10.0 | 10.0 | 10.0 | 10.0 | 10.0 | 10.0 | 10.0 | 10.0 | 10.0 |
| Surfactant | Siloxane compound (effective component concentration: 100% by mass) | 1.0 | 1.0 | 1.0 | 1.0 | 1.0 | 1.0 | 1.0 | 1.0 | 1.0 |
| Water | Ion-exchanged water | balance | balance | balance | balance | balance | balance | balance | balance | balance |
|  | Total (% by mass) | 100.0 | 100.0 | 100.0 | 100.0 | 100.0 | 100.0 | 100.0 | 100.0 | 100.0 |
|  | Cyan pigment proportion (% by mass) | 1.20 |  |  | 0.80 |  |  | 0.80 |  |  |
|  | Magenta pigment proportion (% by mass) |  | 3.50 |  |  | 3.20 |  |  | 3.20 |  |
|  | Yellow pigment proportion (% by mass) |  |  | 3.00 |  |  | 2.00 |  |  | 2.00 |
|  | Magenta pigment proportion/cyan pigment proportion (times) |  | 2.9 |  |  | 4.0 |  |  | 4.0 |  |
|  | Yellow pigment proportion/cyan pigment proportion (times) |  | 2.5 |  |  | 2.5 |  |  | 2.5 |  |
|  | Proportion of water | balance | balance | balance | balance | balance | balance | balance | balance | balance |
|  | Proportion of organic solvent with SP value of 10 or less (% by mass) | 25.0 | 25.0 | 25.0 | 25.0 | 25.0 | 25.0 | 15.0 | 15.0 | 15.0 |
|  | Kind of print medium |  | Cloth |  |  | PVC |  |  | Cloth |  |
| Evaluation result | Color variation |  | 4 |  |  | 4 |  |  | 4 |  |

TABLE 4

|  |  | Ex. 10 | | | Ex. 11 | | | Ex. 12 | | |
| --- | --- | --- | --- | --- | --- | --- | --- | --- | --- | --- |
|  |  | C | M | Y | C | M | Y | C | M | Y |
| Coloring Material | Cyan pigment dispersion (pigment concentration: 15% by mass) | 5.3 | | | 4.7 | | | 9.3 | | |
|  | Magenta pigment dispersion (pigment concentration: 15% by mass) | | 21.3 | | | 22.0 | | | 17.3 | |
|  | Yellow pigment dispersion (pigment concentration: 15% by mass) | | | 13.3 | | | 13.3 | | | 12.0 |
| Organic Solvent | 1,3-Butanediol (SP value: 12.8) | 25.0 | 25.0 | 25.0 | 20.0 | 20.0 | 20.0 | 20.0 | 20.0 | 20.0 |
|  | 3-Methoxy-N,N-dimethyl propionamide (SP value: 9.2) | 10.0 | 10.0 | 10.0 | 10.0 | 10.0 | 10.0 | 10.0 | 10.0 | 10.0 |
|  | Diethylene glycol diethyl ether (SP value: 8.2) | 10.0 | 10.0 | 10.0 | 5.0 | 5.0 | 5.0 | 5.0 | 5.0 | 5.0 |
|  | Triethylene glycol butyl methyl ether (SP value: 8.4) | 5.0 | 5.0 | 5.0 | 5.0 | 5.0 | 5.0 | 5.0 | 5.0 | 5.0 |
| Resin particles | Polycarbonate urethane resin particle liquid (solid concentration: 30% by mass) | 10.0 | 10.0 | 10.0 | 10.0 | 10.0 | 10.0 | 10.0 | 10.0 | 10.0 |
| Surfactant | Siloxane compound (effective component concentration: 100% by mass) | 1.0 | 1.0 | 1.0 | 1.0 | 1.0 | 1.0 | 1.0 | 1.0 | 1.0 |
| Water | Ion-exchanged water | balance | balance | balance | balance | balance | balance | balance | balance | balance |
|  | Total (% by mass) | 100.0 | 100.0 | 100.0 | 100.0 | 100.0 | 100.0 | 100.0 | 100.0 | 100.0 |
|  | Cyan pigment proportion (% by mass) | 0.80 | | | 0.70 | | | 1.40 | | |
|  | Magenta pigment proportion (% by mass) | | 3.20 | | | 3.30 | | | 2.60 | |
|  | Yellow pigment proportion (% by mass) | | | 4.0 | | | 4.7 | | | 1.9 |
|  | Magenta pigment proportion/cyan pigment proportion (times) | | 4.0 | | | 4.7 | | | 1.9 | |
|  | Yellow pigment proportion/cyan pigment proportion (times) | | | 2.5 | | | 2.9 | | | 1.3 |
|  | Proportion of water | balance | balance | balance | balance | balance | balance | balance | balance | balance |
|  | Proportion of organic solvent with SP value of 10 or less (% by mass) | 25.0 | 25.0 | 25.0 | 20.0 | 20.0 | 20.0 | 20.0 | 20.0 | 20.0 |
|  | Kind of print medium | | Cloth | | | PVC | | | PVC | |
| Evaluation result | Color variation | | 4 | | | 5 | | | 3 | |

TABLE 5

|  |  | Ex. 13 | | |
| --- | --- | --- | --- | --- |
|  |  | C | M | Y |
| Coloring Material | Cyan pigment dispersion (pigment concentration: 15% by mass) | 6.7 | | |
|  | Magenta pigment dispersion (pigment concentration: 15% by mass) | | 8.7 | |
|  | Yellow pigment dispersion (pigment concentration: 15% by mass) | | | 8.7 |
| Organic Solvent | 1,3-Butanediol (SP value: 12.8) | 20.0 | 20.0 | 20.0 |
|  | 3-Methoxy-N,N-dimethyl propionamide (SP value: 9.2) | 10.0 | 10.0 | 10.0 |
|  | Diethylene glycol diethyl ether (SP value: 8.2) | 10.0 | 10.0 | 10.0 |
|  | Triethylene glycol butyl methyl ether (SP value: 8.4) | | | |
| Resin particles | Polycarbonate urethane resin particle liquid (solid concentration: 30% by mass) | 10.0 | 10.0 | 10.0 |
| Surfactant | Siloxane compond (effective component concentration: 100% by mass) | 1.0 | 1.0 | 1.0 |
| Water | Ion-exchanged water | balance | balance | balance |
|  | Total (% by mass) | 100.0 | 100.0 | 100.0 |
|  | Cyan pigment proportion (% by mass) | 1.00 | | |
|  | Magenta pigment proportion (% by mass) | | 1.30 | |
|  | Yellow pigment proportion (% by mass) | | | 1.30 |
|  | Magenta pigment proportion/cyan pigment proportion (times) | | 1.3 | |
|  | Yellow pigment proportion/cyan pigment proportion (times) | | | 1.3 |
|  | Proportion of water | balance | balance | balance |
|  | Proportion of organic solvent with SP value of 10 or less (% by mass) | 20.0 | 20.0 | 20.0 |
|  | Kind of print medium | | PVC | |
| Evaluation result | Color variation | | 2 | |

TABLE 6

|  |  | Comp. Ex. 1 | | | Comp. Ex. 2 | | | Comp. Ex. 3 | | |
| --- | --- | --- | --- | --- | --- | --- | --- | --- | --- | --- |
|  |  | C | M | Y | C | M | Y | C | M | Y |
| Coloring Material | Cyan pigment dispersion (pigment concentration: 15% by mass) | 10.0 | | | 4.0 | | | 13.3 | | |

TABLE 6-continued

|  |  | Comp. Ex. 1 | | | Comp. Ex. 2 | | | Comp. Ex. 3 | | |
| --- | --- | --- | --- | --- | --- | --- | --- | --- | --- | --- |
|  |  | C | M | Y | C | M | Y | C | M | Y |
|  | Magenta pigment dispersion (pigment concentration: 15% by mass) |  | 20.0 |  |  | 16.7 |  |  | 20.0 |  |
|  | Yellow pigment dispersion (pigment concentration: 15% by mass) |  |  | 20.0 |  |  | 16.7 |  |  | 20.0 |
| Organic Solvent | 1,3-Butanediol (SP value: 12.8) | 20.0 | 20.0 | 20.0 | 20.0 | 20.0 | 20.0 | 20.0 | 20.0 | 20.0 |
|  | 3-Methoxy-N,N-dimethyl propionamide (SP value: 9.2) | 10.0 | 10.0 | 10.0 | 10.0 | 10.0 | 10.0 | 10.0 | 10.0 | 10.0 |
|  | Diethylene glycol diethyl ether (SP value: 8.2) | 10.0 | 10.0 | 10.0 | 10.0 | 10.0 | 10.0 | 10.0 | 10.0 | 10.0 |
|  | Triethylene glycol butyl methyl ether (SP value: 8.4) |  |  |  |  |  |  |  |  |  |
| Resin particles | Polycarbonate urethane resin particle liquid (solid concentration: 30% by mass) | 10.0 | 10.0 | 10.0 | 10.0 | 10.0 | 10.0 | 10.0 | 10.0 | 10.0 |
| Surfactant | Siloxane compound (effective component concentration: 100% by mass) | 1.0 | 1.0 | 1.0 | 1.0 | 1.0 | 1.0 | 1.0 | 1.0 | 1.0 |
| Water | Ion-exchanged water | balance | balance | balance | balance | balance | balance | balance | balance | balance |
|  | Total (% by mass) | 100.0 | 100.0 | 100.0 | 100.0 | 100.0 | 100.0 | 100.0 | 100.0 | 100.0 |
|  | Cyan pigment proportion (% by mass) | 1.50 |  |  | 0.60 |  |  | 2.00 |  |  |
|  | Magenta pigment proportion (% by mass) |  | 3.00 |  |  | 2.50 |  |  | 3.00 |  |
|  | Yellow pigment proportion (% by mass) |  |  | 3.00 |  |  | 2.50 |  |  | 3.00 |
|  | Magenta pigment proportion/cyan pigment proportion (times) |  | 2.0 |  |  | 4.2 |  |  | 1.5 |  |
|  | Yellow pigment proportion/cyan pigment proportion (times) |  |  | 2.0 |  |  | 4.2 |  |  | 1.5 |
|  | Proportion of water | balance | balance | balance | balance | balance | balance | balance | balance | balance |
|  | Proportion of organic solvent with SP value of 10 or less (% by mass) | 20.0 | 20.0 | 20.0 | 20.0 | 20.0 | 20.0 | 20.0 | 20.0 | 20.0 |
|  | Kind of print medium |  | PVC |  |  | PVC |  |  | PVC |  |
| Evaluation result | Color variation |  | 1 |  |  | 1 |  |  | 1 |  |

TABLE 7

|  |  | Comp. Ex. 4 | | | Comp. Ex. 5 | | | Comp. Ex. 6 | | |
| --- | --- | --- | --- | --- | --- | --- | --- | --- | --- | --- |
|  |  | C | M | Y | C | M | Y | C | M | Y |
| Coloring Material | Cyan pigment dispersion (pigment concentration: 15% by mass) | 4.0 |  |  | 10.0 |  |  | 10.0 |  |  |
|  | Magenta pigment dispersion (pigment concentration: 15% by mass) |  | 23.3 |  |  | 23.0 |  |  | 9.3 |  |
|  | Yellow pigment dispersion (pigment concentration: 15% by mass) |  |  | 23.3 |  |  | 23.0 |  |  | 9.3 |
| Organic Solvent | 1,3-Butanediol (SP value: 12.8) | 20.0 | 20.0 | 20.0 | 20.0 | 20.0 | 20.0 | 20.0 | 20.0 | 20.0 |
|  | 3-Methoxy-N,N-dimethyl propionamide (SP value: 9.2) | 10.0 | 10.0 | 10.0 | 10.0 | 10.0 | 10.0 | 10.0 | 10.0 | 10.0 |
|  | Diethylene glycol diethyl ether (SP value: 8.2) | 10.0 | 10.0 | 10.0 | 10.0 | 10.0 | 10.0 | 10.0 | 10.0 | 10.0 |
|  | Triethylene glycol butyl methyl ether (SP value: 8.4) |  |  |  |  |  |  |  |  |  |
| Resin particles | Polycarbonate urethane resin particle liquid (solid concentration: 30% by mass) | 10.0 | 10.0 | 10.0 | 10.0 | 10.0 | 10.0 | 10.0 | 10.0 | 10.0 |
| Surfactant | Siloxane compound (effective component concentration: 100% by mass) | 1.0 | 1.0 | 1.0 | 1.0 | 1.0 | 1.0 | 1.0 | 1.0 | 1.0 |
| Water | Ion-exchanged water | balance | balance | balance | balance | balance | balance | balance | balance | balance |
|  | Total (% by mass) | 100.0 | 100.0 | 100.0 | 100.0 | 100.0 | 100.0 | 100.0 | 100.0 | 100.0 |
|  | Cyan pigment proportion (% by mass) | 0.60 |  |  | 1.50 |  |  | 1.50 |  |  |
|  | Magenta pigment proportion (% by mass) |  | 3.50 |  |  | 2.30 |  |  | 1.40 |  |
|  | Yellow pigment proportion (% by mass) |  |  | 3.50 |  |  | 2.30 |  |  | 1.40 |
|  | Magenta pigment proportion/cyan pigment proportion (times) |  | 5.8 |  |  | 1.5 |  |  | 0.9 |  |

TABLE 7-continued

|  |  | Comp. Ex. 4 | | | Comp. Ex. 5 | | | Comp. Ex. 6 | | |
| --- | --- | --- | --- | --- | --- | --- | --- | --- | --- | --- |
|  |  | C | M | Y | C | M | Y | C | M | Y |
| | Yellow pigment proportion/cyan pigment proportion (times) | | 5.8 | | | 1.5 | | | 0.9 | |
| | Proportion of water | balance | balance | balance | balance | balance | balance | balance | balance | balance |
| | Proportion of organic solvent with SP value of 10 or less (% by mass) | 20.0 | 20.0 | 20.0 | 20.0 | 20.0 | 20.0 | 20.0 | 20.0 | 20.0 |
| | Kind of print medium | | PVC | | | PVC | | | PVC | |
| Evaluation result | Color variation | | 1 | | | 1 | | | 1 | |

TABLE 8

|  |  | Ex. 14 | | | | Ex. 15 | | | |
| --- | --- | --- | --- | --- | --- | --- | --- | --- | --- |
|  |  | K | C | M | Y | K | C | M | Y |
| Coloring Material | Black pigment dispersion (pigment concentration: 15% by mass) | 20.0 | | | | 13.3 | | | |
|  | Cyan pigment dispersion (pigment concentration: 15% by mass) | | 6.7 | | | | 6.7 | | |
|  | Magenta pigment dispersion (pigment concentration: 15% by mass) | | | 20.0 | | | | 13.3 | |
|  | Yellow pigment dispersion (pigment concentration: 15% by mass) | | | | 13.3 | | | | 10.0 |
|  | White pigment dispersion (pigment concentration: 25% by mass) | | | | | | | | |
| Organic Solvent | 1,3-Butanediol (SP value: 12.8) | 20.0 | 20.0 | 20.0 | 20.0 | 20.0 | 20.0 | 20.0 | 20.0 |
|  | 3-Methoxy-N,N-dimethyl propionamide (SP value: 9.2) | 10.0 | 10.0 | 10.0 | 10.0 | 10.0 | 10.0 | 10.0 | 10.0 |
|  | Diethylene glycol diethyl ether (SP value: 8.2) | 2.0 | 5.0 | 2.0 | 3.0 | 3.0 | 5.0 | 3.0 | 4.0 |
|  | Triethylene glycol butyl methyl ether (SP value: 8.4) | 5.0 | 5.0 | 5.0 | 5.0 | 5.0 | 5.0 | 5.0 | 5.0 |
| Resin particles | Polycarbonate urethane resin particle liquid (solid concentration: 30% by mass) | 10.0 | 10.0 | 10.0 | 10.0 | 10.0 | 10.0 | 10.0 | 10.0 |
| Surfactant | Siloxane compound (effective component concentration: 100% by mass) | 1.0 | 1.0 | 1.0 | 1.0 | 1.0 | 1.0 | 1.0 | 1.0 |
| Water | Ion-exchanged water | balance | balance | balance | balance | balance | balance | balance | balance |
| | Total (% by mass) | 100.0 | 100.0 | 100.0 | 100.0 | 100.0 | 100.0 | 100.0 | 100.0 |
| | Black pigment proportion (% by mass) | 3.0 | — | — | — | 2.0 | — | — | — |
| | Cyan pigment proportion (% by mass) | — | 1.0 | — | — | — | 1.0 | — | — |
| | Magenta pigment proportion (% by mass) | — | — | 3.0 | — | — | — | 2.0 | — |
| | Yellow pigment proportion (% by mass) | — | — | — | 2.0 | — | — | — | 1.5 |
| | White pigment proportion (% by mass) | — | — | — | — | — | — | — | — |
| | Magenta pigment proportion/cyan pigment proportion (times) | | 3.0 | | | | 2.0 | | |
| | Yellow pigment proportion/cyan pigment proportion (times) | | 2.0 | | | | 1.5 | | |
| | Proportion of organic solvent with SP value of 10 or less (% by mass) | 17.0 | 20.0 | 17.0 | 18.0 | 18.0 | 20.0 | 18.0 | 19.0 |
| | Ratio (P/R) of cyan pigment proportion P to resin particle proportion R | — | 0.33 | — | — | — | 0.33 | — | — |
| | Kind of print medium | | PVC | | | | PVC | | |
| Evaluation result | Color variation | | 4 | | | | 4 | | |

TABLE 9

|  |  | Ex. 16 | | | | Ex. 17 | | | |
| --- | --- | --- | --- | --- | --- | --- | --- | --- | --- |
|  |  | K | C | M | Y | K | C | M | Y |
| Coloring Material | Black pigment dispersion (pigment concentration: 15% by mass) | 20.0 | | | | 13.3 | | | |
|  | Cyan pigment dispersion (pigment concentration: 15% by mass) | | 6.7 | | | | 4.7 | | |

TABLE 9-continued

|  |  | Ex. 16 | | | | Ex. 17 | | | |
| --- | --- | --- | --- | --- | --- | --- | --- | --- | --- |
|  |  | K | C | M | Y | K | C | M | Y |
|  | Magenta pigment dispersion (pigment concentration: 15% by mass) |  |  | 20.0 |  |  |  | 13.3 |  |
|  | Yellow pigment dispersion (pigment concentration: 15% by mass) |  |  |  | 13.3 |  |  |  | 10.0 |
|  | White pigment dispersion (pigment concentration: 25% by mass) |  |  |  |  |  |  |  |  |
| Organic Solvent | 1,3-Butanediol (SP value: 12.8) | 20.0 | 20.0 | 20.0 | 20.0 | 20.0 | 20.0 | 20.0 | 20.0 |
|  | 3-Methoxy-N,N-dimethyl propionamide (SP value: 9.2) | 10.0 | 10.0 | 10.0 | 10.0 | 10.0 | 10.0 | 10.0 | 10.0 |
|  | Diethylene glycol diethyl ether (SP value: 8.2) | 2.0 | 5.0 | 2.0 | 3.0 | 3.0 | 5.0 | 3.0 | 4.0 |
|  | Triethylene glycol butyl methyl ether (SP value: 8.4) | 3.0 | 3.0 | 3.0 | 3.0 | 4.0 | 4.0 | 4.0 | 4.0 |
| Resin particles | Polycarbonate urethane resin particle liquid (solid concentration: 30% by mass) | 20.0 | 20.0 | 20.0 | 20.0 | 16.7 | 16.7 | 16.7 | 16.7 |
| Surfactant | Siloxane compound (effective component concentration: 100% by mass) | 1.0 | 1.0 | 1.0 | 1.0 | 1.0 | 1.0 | 1.0 | 1.0 |
| Water | Ion-exchanged water | balance | balance | balance | balance | balance | balance | balance | balance |
|  | Total (% by mass) | 100.0 | 100.0 | 100.0 | 100.0 | 100.0 | 100.0 | 100.0 | 100.0 |
|  | Black pigment proportion (% by mass) | 3.0 | — | — | — | 2.0 | — | — | — |
|  | Cyan pigment proportion (% by mass) | — | 1.0 | — | — | — | 0.7 | — | — |
|  | Magenta pigment proportion (% by mass) | — | — | 3.0 | — | — | — | 2.0 | — |
|  | Yellow pigment proportion (% by mass) | — | — | — | 2.0 | — | — | — | 1.5 |
|  | White pigment proportiom (% by mass) | — | — | — | — | — | — | — | — |
|  | Magenta pigment proportion/cyan pigment proportion (times) |  | 3.0 |  |  |  | 2.9 |  |  |
|  | Yellow pigment proportion/cyan pigment proportion (times) |  | 2.0 |  |  |  | 3.1 |  |  |
|  | Proportion of organic solvent with SP value of 10 or less (% by mass) | 15.0 | 18.0 | 15.0 | 16.0 | 17.0 | 19.0 | 17.0 | 18.0 |
|  | Ratio (P/R) of cyan pigment proportion P to resin particle proportion R | — | 0.17 | — | — | — | 0.14 | — | — |
|  | Kind of print medium |  | PVC |  |  |  | PVC |  |  |
| Evaluation result | Color variation |  | 5 |  |  |  | 5 |  |  |

TABLE 10

|  |  | Ex. 18 | | | |
| --- | --- | --- | --- | --- | --- |
|  |  | K | C | M | Y |
| Coloring Material | Black pigment dispersion (pigment concentration: 15% by mass) | 20.0 |  |  |  |
|  | Cyan pigment dispersion (pigment concentration: 15% by mass) |  | 9.3 |  |  |
|  | Magenta pigment dispersion (pigment concentration: 15% by mass) |  |  | 20.0 |  |
|  | Yellow pigment dispersion (pigment concentration: 15% by mass) |  |  |  | 13.3 |
|  | White pigment dispersion (pigment concentration: 25% by mass) |  |  |  |  |
| Organic Solvent | 1,3-Butanediol (SP value: 12.8) | 20.0 | 20.0 | 20.0 | 20.0 |
|  | 3-Methoxy-N,N-dimethyl propionamide (SP value: 9.2) | 10.0 | 10.0 | 10.0 | 10.0 |
|  | Diethylene glycol diethyl ether (SP value: 8.2) | 2.0 | 5.0 | 2.0 | 3.0 |
|  | Triethylene glycol butyl methyl ether (SP value: 8.4) | 3.0 | 3.0 | 3.0 | 3.0 |
| Resin particles | Polycarbonate urethane resin particle liquid (solid concentration: 30% by mass) | 20.0 | 23.3 | 20.0 | 20.0 |
| Surfactant | Siloxane compond (effective component concentration: 100% by mass) | 1.0 | 1.0 | 1.0 | 1.0 |
| Water | Ion-exchanged water | balance | balance | balance | balance |
|  | Total (% by mass) | 100.0 | 100.0 | 100.0 | 100.0 |
|  | Black pigment proportion (% by mass) | 3.0 | — | — | — |
|  | Cyan pigment proportion (% by mass) | — | 1.4 | — | — |
|  | Magenta pigment proportion (% by mass) | — | — | 3.0 | — |
|  | Yellow pigment proportion (% by mass) | — | — | — | 2.0 |
|  | White pigment proportion (% by mass) | — | — | — | — |
|  | Magenta pigment proportion/cyan pigment proportion (times) |  |  | 2.1 |  |

TABLE 10-continued

|  | Ex. 18 | | | |
|---|---|---|---|---|
|  | K | C | M | Y |
| Yellow pigment proportion/cyan pigment proportion (times) |  | 1.4 | | |
| Proportion of organic solvent with SP value of 10 or less (% by mass) | 15.0 | 18.0 | 15.0 | 16.0 |
| Ratio (P/R) of cyan pigment porprotion P to resin particle proportion R | — | 0.20 | — | — |
| Kind of print medium | PVC | | | |
| Evaluation result  Color variation | 5 | | | |

TABLE 11

|  |  | Ex. 19 | | | | | Ex. 20 | | | | |
|---|---|---|---|---|---|---|---|---|---|---|---|
|  |  | K | C | M | Y | W | K | C | M | Y | W |
| Coloring Material | Black pigment dispersion (pigment concentration: 15% by mass) | 13.3 |  |  |  |  | 20.0 |  |  |  |  |
|  | Cyan pigment disipersion (pigment concentration: 15% by mass) |  | 4.7 |  |  |  |  | 9.3 |  |  |  |
|  | Magenta pigment dispersion (pigment concentration: 15% by mass) |  |  | 13.3 |  |  |  |  | 20.0 |  |  |
|  | Yellow pigment dispersion (pigment concentration: 15% by mass) |  |  |  | 10.0 |  |  |  |  | 13.3 |  |
|  | White pigment dispersion (pigment concentration: 25% by mass) |  |  |  |  | 32.0 |  |  |  |  | 32.0 |
| Organic Solvent | 1,3-Butanediol (SP value: 12.8) | 20.0 | 20.0 | 20.0 | 20.0 | 15.0 | 20.0 | 20.0 | 20.0 | 20.0 | 15.0 |
|  | 3-Methoxy-N,N-dimethyl propionamide (SP value 9.2) | 10.0 | 10.0 | 10.0 | 10.0 | 10.0 | 10.0 | 10.0 | 10.0 | 10.0 | 10.0 |
|  | Diethylene glycol diethyl ether (SP value: 8.2) | 3.0 | 5.0 | 3.0 | 4.0 | 3.0 | 2.0 | 5.0 | 2.0 | 3.0 | 3.0 |
|  | Triethylene glycol butyl methyl ether (SP value: 8.4) | 4.0 | 4.0 | 4.0 | 4.0 | 2.0 | 3.0 | 3.0 | 3.0 | 3.0 | 2.0 |
| Resin particles | Polycarbonate urethane resin particle liquid (solid concentration: 30% by mass) | 16.7 | 16.7 | 16.7 | 16.7 | 26.7 | 20.0 | 23.3 | 20.0 | 20.0 | 26.7 |
| Surfactant | Siloxane compound (effective component concentration: 100% by mass) | 1.0 | 1.0 | 1.0 | 1.0 | 1.0 | 1.0 | 1.0 | 1.0 | 1.0 | 1.0 |
| Water | Ion-exchanged water | balance | balance | balance | balance | balance | balance | balance | balance | balance | balance |
|  | Total (% by mass) | 100.0 | 100.0 | 100.0 | 100.0 | 100.0 | 100.0 | 100.0 | 100.0 | 100.0 | 100.0 |
|  | Black pigment proportion (% by mass) | 2.0 | — | — | — | — | 3.0 | — | — | — | — |
|  | Cyan pigment proportion (% by mass) | — | 0.7 | — | — | — | — | 1.4 | — | — | — |
|  | Magenta pigment proportion (% by mass) | — | — | 2.0 | — | — | — | — | 3.0 | — | — |
|  | Yellow pigment proportion (% by mass) | — | — | — | 1.5 | — | — | — | — | 2.0 | — |
|  | White pigment proportion (% by mass) | — | — | — | — | 8.0 | — | — | — | — | 8.0 |
|  | Magenta pigment proportion/cyan pigment proportion (times) |  |  | 2.9 |  |  |  |  | 2.1 |  |  |
|  | Yellow pigment proportion/cyan pigment proportion (times) |  |  | 2.1 |  |  |  |  | 1.4 |  |  |
|  | Proportion of organic solvent with SP value of 10 or less (% by mass) | 17.0 | 19.0 | 17.0 | 18.0 | 15.0 | 15.0 | 18.0 | 15.0 | 16.0 | 15.0 |
|  | Ration (P/R) of cyan pigment proportion P to resin particle proportion R | — | 0.14 | — | — | — | — | 0.20 | — | — | — |
|  | King of print medium | PVC | | | | | PVC | | | | |
| Evaluation result | Color variation | 5 | | | | | 5 | | | | |

TABLE 12

|  |  | Comp. Ex. 7 | | | | Comp. Ex. 8 | | | |
|---|---|---|---|---|---|---|---|---|---|
|  |  | K | C | M | Y | K | C | M | Y |
| Coloring Material | Black pigment dispersion (pigment concentration: 15% by mass) | 20.0 |  |  |  | 13.3 |  |  |  |
|  | Cyan pigment disipersion (pigment concentration: 15% by mass) |  | 10.0 |  |  |  | 4.0 |  |  |
|  | Magenta pigment dispersion (pigment concentration: 15% by mass) |  |  | 20.0 |  |  |  | 13.3 |  |

TABLE 12-continued

|  |  | Comp. Ex. 7 | | | | Comp. Ex. 8 | | | |
|---|---|---|---|---|---|---|---|---|---|
|  |  | K | C | M | Y | K | C | M | Y |
|  | Yellow pigment dispersion (pigment concentration: 15% by mass) |  |  |  | 13.3 |  |  |  | 10.0 |
|  | White pigment dispersion (pigment concentration: 25% by mass) |  |  |  |  |  |  |  |  |
| Organic Solvent | 1,3-Butanediol (SP value: 12.8) | 20.0 | 20.0 | 20.0 | 20.0 | 20.0 | 20.0 | 20.0 | 20.0 |
|  | 3-Methoxy-N,N-dimethyl propionamide (SP value 9.2) | 10.0 | 10.0 | 10.0 | 10.0 | 10.0 | 10.0 | 10.0 | 10.0 |
|  | Diethylene glycol diethyl ether (SP value: 8.2) | 2.0 | 5.0 | 2.0 | 3.0 | 3.0 | 5.0 | 3.0 | 4.0 |
|  | Triethylene glycol butyl methyl ether (SP value: 8.4) | 5.0 | 5.0 | 5.0 | 5.0 | 5.0 | 5.0 | 5.0 | 5.0 |
| Resin particles | Polycarbonate urethane resin particle liquid (solid concentration: 30% by mass) | 10.0 | 10.0 | 10.0 | 10.0 | 10.0 | 10.0 | 10.0 | 10.0 |
| Surfactant | Siloxane compound (effective component concentration: 100% by mass) | 1.0 | 1.0 | 1.0 | 1.0 | 1.0 | 1.0 | 1.0 | 1.0 |
| Water | Ion-exchanged water | balance | balance | balance | balance | balance | balance | balance | balance |
|  | Total (% by mass) | 100.0 | 100.0 | 100.0 | 100.0 | 100.0 | 100.0 | 100.0 | 100.0 |
|  | Black pigment proportion (% by mass) | 3.0 | — | — | — | 2.0 | — | — | — |
|  | Cyan pigment proportion (% by mass) | — | 1.5 | — | — | — | 0.6 | — | — |
|  | Magenta pigment proportion (% by mass) | — | — | 3.0 | — | — | — | 2.0 | — |
|  | Yellow pigment proportion (% by mass) | — | — | — | 2.0 | — | — | — | 1.5 |
|  | White pigment proportion (% by mass) | — | — | — | — | — | — | — | — |
|  | Magenta pigment proportion/cyan pigment proportion (times) | | 2.0 | | | | 3.3 | | |
|  | Yellow pigment proportion/cyan pigment proportion (times) | | 1.3 | | | | 4.2 | | |
|  | Proportion of organic solvent with SP value of 10 or less (% by mass) | 17.0 | 20.0 | 17.0 | 18.0 | 18.0 | 20.0 | 18.0 | 19.0 |
|  | Ration (P/R) of cyan pigment proportion P to resin particle proportion R | — | 0.50 | — | — | — | 0.20 | — | — |
|  | King of print medium | | PVC | | | | PVC | | |
| Evaluation result | Color variation | | 2 | | | | 2 | | |

TABLE 13

|  |  | Comp. Ex. 9 | | | | | Comp. Ex. 10 | | | | |
|---|---|---|---|---|---|---|---|---|---|---|---|
|  |  | K | C | M | Y | W | K | C | M | Y | W |
| Coloring Material | Black pigment dispersion (pigment concentration: 15% by mass) | 13.3 |  |  |  |  | 20.0 |  |  |  |  |
|  | Cyan pigment disipersion (pigment concentration: 15% by mass) |  | 13.3 |  |  |  |  | 20.0 |  |  |  |
|  | Magenta pigment dispersion (pigment concentration: 15% by mass) |  |  | 13.3 |  |  |  |  | 20.0 |  |  |
|  | Yellow pigment dispersion (pigment concentration: 15% by mass) |  |  |  | 10.0 |  |  |  |  | 13.3 |  |
|  | White pigment dispersion (pigment concentration: 25% by mass) |  |  |  |  | 32.0 |  |  |  |  | 32.0 |
| Organic Solvent | 1,3-Butanediol (SP value: 12.8) | 20.0 | 20.0 | 20.0 | 20.0 | 15.0 | 20.0 | 20.0 | 20.0 | 20.0 | 15.0 |
|  | 3-Methoxy-N,N-dimethyl propionamide (SP value 9.2) | 10.0 | 10.0 | 10.0 | 10.0 | 10.0 | 10.0 | 10.0 | 10.0 | 10.0 | 10.0 |
|  | Diethylene glycol diethyl ether (SP value: 8.2) | 3.0 | 5.0 | 3.0 | 4.0 | 3.0 | 2.0 | 5.0 | 2.0 | 3.0 | 3.0 |
|  | Triethylene glycol butyl methyl ether (SP value: 8.4) | 4.0 | 4.0 | 4.0 | 4.0 | 2.0 | 3.0 | 3.0 | 3.0 | 3.0 | 2.0 |
| Resin particles | Polycarbonate urethane resin particle liquid (solid concentration: 30% by mass) | 16.7 | 16.7 | 16.7 | 16.7 | 26.7 | 20.0 | 23.3 | 20.0 | 20.0 | 26.7 |
| Surfactant | Siloxane compound (effective component concentration: 100% by mass) | 1.0 | 1.0 | 1.0 | 1.0 | 1.0 | 1.0 | 1.0 | 1.0 | 1.0 | 1.0 |
| Water | Ion-exchanged water | balance | balance | balance | balance | balance | balance | balance | balance | balance | balance |
|  | Total (% by mass) | 100.0 | 100.0 | 100.0 | 100.0 | 100.0 | 100.0 | 100.0 | 100.0 | 100.0 | 100.0 |
|  | Black pigment proportion (% by mass) | 2.0 | — | — | — | — | 3.0 | — | — | — | — |
|  | Cyan pigment proportion (% by mass) | — | 2.0 | — | — | — | — | 3.0 | — | — | — |
|  | Magenta pigment proportion (% by mass) | — | — | 2.0 | — | — | — | — | 3.0 | — | — |
|  | Yellow pigment proportion (% by mass) | — | — | — | 1.5 | — | — | — | — | 2.0 | — |
|  | White pigment proportion (% by mass) | — | — | — | — | 8.0 | — | — | — | — | 8.0 |

TABLE 13-continued

| | Comp. Ex. 9 | | | | | Comp. Ex. 10 | | | | |
|---|---|---|---|---|---|---|---|---|---|---|
| | K | C | M | Y | W | K | C | M | Y | W |
| Magenta pigment proportion/cyan pigment proportion (times) | | | 1.0 | | | | | 1.0 | | |
| Yellow pigment proportion/cyan pigment proportion (times) | | | | 0.8 | | | | | 0.7 | |
| Proportion of organic solvent with SP value of 10 or less (% by mass) | 17.0 | 19.0 | 17.0 | 18.0 | 15.0 | 15.0 | 18.0 | 15.0 | 16.0 | 15.0 |
| Ration (P/R) of cyan pigment proportion P to resin particle proportion R | — | 0.40 | — | — | — | — | 0.43 | — | — | — |
| King of print medium | | | PVC | | | | | PVC | | |
| Evaluation result  Color variation | | | 1 | | | | | 1 | | |

Aspects of the present disclosure are, for example, as follows.

<1> An ink set including:
an ink containing a cyan pigment;
an ink containing a magenta pigment; and
an ink containing a yellow pigment,
wherein the proportion of the cyan pigment is 0.70% by mass or greater but 1.40% by mass or less, and
wherein the proportion of the magenta pigment and the proportion of the yellow pigment are both higher than the proportion of the cyan pigment.

<2> The ink set according to <1>,
wherein the proportion of the magenta pigment and the proportion of the yellow pigment are both 1.4 times or greater but 4.5 times or less higher than the proportion of the cyan pigment.

<3> The ink set according to <1> or <2>,
wherein the proportion of the cyan pigment is 1.0% by mass or greater but 1.2% by mass or less, and wherein the proportion of the magenta pigment and the proportion of the yellow pigment are both 2 times or greater but 3 times or less higher than the proportion of the cyan pigment.

<4> The ink set according to any one of <1> to <3>,
wherein all of the ink containing the cyan pigment, the ink containing the magenta pigment, and the ink containing the yellow pigment contain water.

<5> The ink set according to any one of <1> to <4>,
wherein all of the ink containing the cyan pigment, the ink containing the magenta pigment, and the ink containing the yellow pigment contain an organic solvent having a solubility parameter (SP value) of 10 or less, and wherein the proportion of the organic solvent is 20% by mass or less.

<6> An ink set used in a printer including a discharging unit provided with three or more nozzle lines, which are arrangements, in a sub-scanning direction perpendicular to a main scanning direction, of a plurality of nozzle holes through which inks are discharged, the ink set including:
an ink containing a cyan pigment;
an ink containing a magenta pigment; and an ink containing a yellow pigment,
wherein the proportion of the cyan pigment is 0.70% by mass or greater but 1.40% by mass or less, and
wherein the proportion of the magenta pigment and the proportion of the yellow pigment are both 1.4 times or greater but 4.5 times or less higher than the proportion of the cyan pigment.

<7> The ink set according to <6>,
wherein the proportion of the cyan pigment is 1.0% by mass or greater but 1.2% by mass or less, and wherein the proportion of the magenta pigment and the proportion of the yellow pigment are both 2 times or greater but 3 times or less higher than the proportion of the cyan pigment.

<8> The ink set according to <6> or <7>,
wherein all of the ink containing the cyan pigment, the ink containing the magenta pigment, and the ink containing the yellow pigment contain water.

<9> The ink set according to any one of <1> to <8>, further including an ink containing a black pigment.

<10> The ink set according to <9>,
wherein the ink set satisfies formulae (1) and (2) below, Proportion of black pigment>proportion of yellow pigment>proportion of cyan pigment     formula (1)

Proportion of magenta pigment>proportion of yellow pigment>proportion of cyan pigment     formula (2).

<11> The ink set according to <9> or <10>,
wherein the ink set satisfies a formula: proportion of black pigment=proportion of magenta pigment.

<12> The ink set according to any one of <1> to <11>, further including an ink containing a white pigment.

<13> The ink set according to any one of <1> to <12>,
wherein each of the inks of the ink set contains water, an organic solvent, and a resin.

<14> The ink set according to <13>,
wherein the resin includes a urethane resin.

<15> The ink set according to any one of <1> to <14>,
wherein each of the inks of the ink set contains an organic solvent having a solubility parameter (SP value) of 10 or less, and
wherein a proportion of the organic solvent is 20% by mass or less.

<16> The ink set according to any one of <13> to <15>,
wherein a ratio (P/R) of a proportion P of the cyan pigment to a proportion R of the resin in each of the inks of the ink set is 0.08 or greater but 0.20 or less.

<17> The ink set according to any one of <1> to <16>,
wherein the ink set is used over a non-absorbable or low-absorbable print medium.

<18> The ink set according to any one of <1> to <17>,
wherein the ink set is used in a printer including a discharging unit provided with three or more nozzle lines, which are arrangements, in a sub-scanning direction perpendicular to a main scanning direction, of a plurality of nozzle holes through which inks are discharged.

<19> A printer including
a discharging unit provided with three or more nozzle lines, which are arrangements, in a sub scanning direction perpendicular to a main scanning direction, of a plurality of nozzles through which inks are discharged, wherein the inks are the inks of the ink set according to any one of <1> to <18>.

<20> The printer according to <19>, wherein the discharging unit includes a discharging unit provided with six or more nozzle lines, which are arrangements, in the sub-scanning direction perpendicular to the main scanning direction, of the plurality of nozzle holes through which the inks are discharged.

<21> A printing method including using a printer including a discharging unit provided with three or more nozzle lines, which are arrangements, in a sub-scanning direction perpendicular to a main scanning direction, of a plurality of nozzle holes through which inks are discharged, wherein the inks are the inks of the ink set according to any one of <1> to <18>.

<22> The printing method according to <21>, wherein the discharging unit includes a discharging unit provided with six or more nozzle lines, which are arrangements, in the sub-scanning direction perpendicular to the main scanning direction, of the plurality of nozzle holes through which the inks are discharged.

<23> A liquid discharging device including a control unit configured to control the ink set according to any one of <1> to <18> and nozzle lines of an ink discharging unit in a manner that an auxiliary layer, which is a layer auxiliarily formed by discharging a liquid having a color different from process colors, can be deposited as any one selected from the group consisting of a preprint, a post-print, and an intermediate print with respect to an image layer, which is a layer of an image formed by discharging inks having the process colors for image formation.

<24> A printing method including controlling the ink set according to any one of <1> to <18> and nozzle lines of an ink discharging unit in a manner that an auxiliary layer, which is a layer auxiliarily formed by discharging a liquid having a color different from process colors, can be deposited as any one selected from the group consisting of a preprint, a post-print, and an intermediate print with respect to an image layer, which is a layer of an image formed by discharging inks having the process colors for image formation.

The ink set according to any one of <1> to <18>, the printer according to <19> or <20>, the printing method according to <21>, <22>, or <24>, and the liquid discharging device according to <23> can solve the various problems in the related art and achieve the object of the present disclosure.

REFERENCE SIGNS LIST

1: inkjet recording device
10: control unit
20: recording head
20a, 20b, 20c: nozzle group

The invention claimed is:

1. An ink set comprising:
an ink that comprises a cyan pigment;
an ink that comprises a magenta pigment;
an ink that comprises a yellow pigment; and
an ink that comprises a black picmeng,
wherein a proportion of the cyan pigment is 0.70% by mass or greater but 1.40% by mass or less,
wherein a proportion of the magenta pigment and a proportion of the yellow pigment are both higher than the proportion of the cyan pigment, and
wherein the ink set satisfies formulae (1) and (2) below, $$\text{proportion of black pigment} > \text{proportion of yellow pigment} > \text{proportion of cyan pigment} \quad \text{formula (1)},$$

$$\text{proportion of magenta pigment} > \text{proportion of yellow pigment} > \text{proportion of cyan pigment} \quad \text{formula (2)}.$$

2. The ink set according to claim 1,
wherein the proportion of the magenta pigment and the proportion of the yellow pigment are both 1.4 times or greater but 4.5 times or less higher than the proportion of the cyan pigment.

3. The ink set according to claim 2, wherein the ink further includes a white pigment.

4. The ink set according to claim 2, wherein each of the inks of the ink set include water, an organic solvent, and a resin.

5. The ink set according to claim 4, wherein the resin includes a urethane resin.

6. The ink set according to claim 2, wherein each of the inks of the ink set comprises an organic solvent having a solubility parameter (SP value) of 10 or less, and wherein a proportion of the organic solvent is 20% by mass or less.

7. The ink set according to claim 1,
wherein the ink set satisfies a formula: proportion of black pigment=proportion of magenta pigment.

8. The ink set according to claim 1, further comprising an ink that comprises a white pigment.

9. The ink set according to claim 1,
wherein each of the inks of the ink set comprises water, an organic solvent, and a resin.

10. The ink set according to claim 9,
wherein the resin comprises a urethane resin.

11. The ink set according to claim 9,
wherein a ratio (P/R) of a proportion P of the cyan pigment to a proportion R of the resin in each of the inks of the ink set is 0.08 or greater but 0.20 or less.

12. The ink set according to claim 1,
wherein each of the inks of the ink set comprises an organic solvent having a solubility parameter (SP value) of 10 or less, and
wherein a proportion of the organic solvent is 20% by mass or less.

13. The ink set according to claim 1,
wherein the ink set is used over a non-absorbable or low-absorbable print medium.

14. A printing method comprising using a printer that comprises a discharging unit provided with three or more nozzle lines, which are arrangements, in a sub-scanning direction perpendicular to a main scanning direction, of a plurality of nozzle holes through which inks are discharged, wherein the nozzle lines are staggered in the sub-scanning direction, wherein the links comprise inks of an ink set which contains an ink including a cyan pigment, and ink including a magenta pigment, an ink including a yellow pigment, and an ink including a black pigment, wherein a proportion of the cyan pigment is 0.70% by mass or greater but 1.40% by mass or less, wherein a proportion of the magenta pigment and a proportion of the yellow pigment are both higher than the proportion of the cyan pigment, and wherein the formulae (1) and (2) below are satisfied, proportion of black pigment>proportion of yellow pigment>proportion of cyan pigment    formula (1), proportion of magenta pigment>proportion of yellow pigment>proportion of cyan pigment    formula (2).

15. The printing method according to claim 14, wherein the proportion of the magenta pigment and the proportion of the yellow pigment are both 1.4 times or greater but 4.5 times or less higher than the proportion of the cyan pigment.

16. The printing method according to claim 14, wherein the proportion of black pigment is equal to the proportion of magenta pigment.

17. The printing method according to claim 14, wherein the ink further includes a white pigment.

18. The printing method according to claim 14, wherein each of the inks of the ink set include water, an organic solvent, and a resin.

19. The printing method according to claim 18, wherein the resin includes a urethane resin.

20. The printing method according to claim 14, wherein each of the inks of the ink set includes an organic solvent having a solubility parameter (SP value) of 10 or less, and wherein a proportion of the organic solvent is 20% by mass or less.

21. The printing method according to claim 18, wherein a ratio (P/R) of a proportion P of the cyan pigment to a proportion R of the resin in each of the inks of the ink set is 0.08 or greater but 0.20 or less.

22. The printing method according to claim 14, wherein the ink set is used over a non-absorbable or low-absorbable print medium.

23. A printing method comprising:

controlling an ink set and nozzle lines of an ink discharging unit in a manner that an auxiliary layer, which is a layer auxiliarily formed by discharging a liquid having a color different from process colors, can he deposited as any one selected from the group consisting of a preprint a post-print, and an intermediate print with respect to an image layer, which is a layer of an image formed by discharging inks having the process colors for image formation, wherein the ink set contains an ink including a cyan pigment, an ink including a magenta pigment, an ink including a yellow pigment, and an ink including a black pigment, wherein a proportion of the cyan pigment is 0.70% by mass or greater but 1.40% by mass or less, wherein a proportion of the magenta pigment and a proportion of the yellow pigment are both higher than the proportion of the cyan pigment, and wherein the formulae (1) and (2) below are satisfied, proportion of black pigment>proportion of yellow pigment>proportion of cyan pigment    formula (1);

proportion of magenta pigment>proportion of yellow pigment>proportion of cyan pigment    formula (2).

* * * * *